US006209089B1

(12) United States Patent
Selitrennikoff et al.

(10) Patent No.: US 6,209,089 B1
(45) Date of Patent: Mar. 27, 2001

(54) CORRECTING FOR CHANGED CLIENT MACHINE HARDWARE USING A SERVER-BASED OPERATING SYSTEM

(75) Inventors: Sean Selitrennikoff, Bellevue; Adam D. Barr, Redmond; Charles T. Lenzmeier, Woodinville, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/133,312

(22) Filed: Aug. 12, 1998

(51) Int. Cl.[7] .................................. G06F 9/00; H02H 3/05
(52) U.S. Cl. ...................................... 713/2; 714/6
(58) Field of Search ................................ 713/2, 1; 714/6, 714/35; 380/4

(56) References Cited

U.S. PATENT DOCUMENTS

| | | | | |
|---|---|---|---|---|
| 5,675,800 | * | 10/1997 | Fisher, Jr. et al. | 395/700 |
| 5,758,165 | * | 5/1998 | Shuff | 395/712 |
| 5,852,713 | * | 12/1998 | Shannon | 395/182.04 |
| 5,864,664 | * | 1/1999 | Capps, Jr. et al. | 395/186 |
| 5,867,714 | * | 2/1999 | Todd et al. | 395/712 |
| 5,872,956 | * | 2/1999 | Beal et al. | 395/500 |
| 5,974,474 | * | 10/1999 | Furner et al. | 710/8 |
| 5,974,547 | * | 10/1999 | Klimenko | 713/2 |

OTHER PUBLICATIONS

Institute of Electrical and Electronics Engineering, Inc.; IEEE Standards for Boot (Initialization Configuration) Firmware: Core Requirements and Practices, pp. 33–43, Aug. 1994.*

* cited by examiner

Primary Examiner—Robert Beausoleil
Assistant Examiner—Rita Ziemer
(74) Attorney, Agent, or Firm—Workman, Nydegger & Seeley

(57) ABSTRACT

Methods and systems for adjusting an operating system configuration according to changes in hardware components of a client computer. The adjusted operating system can boot on the client computer regardless of changes in the hardware configuration of the client computer since it was last connected to a network server. Before the operating system boots, a preliminary connection is established between the client computer and the server. During the preliminary connection, the system identifies hardware components that are new and that must be supported by the operating system for bootup to occur. In particular, the server sends information relating to the previous client hardware configuration to the client computer. The client computer compares its current hardware configuration to the previous hardware configuration information, thereby identifying its new hardware components. Information identifying the new hardware components is sent to the server. The server locates operating system components or device drivers that support the new hardware components and stores them in a specified repository at the server. The operating system, which is now reconfigured to support the current client hardware components, is downloaded to the client computer and boots thereon.

28 Claims, 16 Drawing Sheets

CORRECTING FOR CHANGED CLIENT MACHINE HARDWARE USING A SERVER-BASED OPERATING SYSTEM

BACKGROUND OF THE INVENTION

1. The Field of the Invention

The present invention relates to methods and systems for booting computers over a network using an operating system stored on a server. In particular, the present invention relates to methods and systems for booting computers over a network regardless of changes in the hardware configuration of the computers since the last time the computers were connected to the server.

2. The Prior State of the Art

As computers have become more powerful and less expensive, their acceptance and use in business have continually increased over the years, and are now standard in many industries. The increasing use of computer networks has been a significant factor in employee productivity gains in the economy. Because the price of computers has generally decreased over the years, the purchase price of a computer is now often a relatively small percentage of the total cost of owning and operating a computer in the business setting. Increasingly, from a business standpoint, the total cost of ownership is a significant factor in the number of computers owned by a business and the breadth of activities in which computers are used. Frequently, a major portion of the total cost of ownership includes installation of new computers and new hardware, the cost of software, and general network administration.

Sometimes, as a result of software problems or hardware failure, a client computer may be rendered temporarily or permanently unusable. For example, the hard disk or the motherboard of a client computer is subject to the risk of failure, with the result that the failed hardware must be replaced or an entirely new computer must be substituted for the failed device. The cost of computer failure includes not only the cost of purchasing new hardware or a new computer but also the time required to physically connect the computer to the network and to configure the computer and the server in order to boot the new computer and make it available to a user. Furthermore, a significant amount of time and cost may be spent in reinstalling and configuring programs that had been used on the particular failed computer.

An example of a typical computer network in the prior art is illustrated in FIG. 1. Network 10 includes one or more server computers 12, one or more client computers 14, and a network infrastructure 16 that allows information to pass between the server computers and the client computers. If a computer 14 fails, it is likely that the hardware of a replacement computer is different from the hardware of the failed computer. If so, the operating system as previously configured may be incompatible with the new hardware. As a result, the administrator is ordinarily required to install the proper operating system software or device drivers in order to support the replacement computer. The administrator time spent in configuring the replacement client computer combined with the down time and associated loss in employee productivity from lack of access to the computer significantly contributes to the total cost of owning a computer in the business setting.

The cost and inconvenience of replacing a failed computer or failed hardware is particularly great when the failed hardware is the hard disk. Failure of a hard disk in a network setting such as that illustrated in FIG. 1 may involve the loss of a great deal of potentially valuable information. Furthermore, the cost of the lost data generally includes the employee time required to replace the data.

Certain types of hardware components are increasingly automatically installed and supported by operating systems and associated device drivers. For example, printers, sound cards, video cards and the like may be essentially automatically installed and supported by some operating systems with minimal or no user input. For instance, some operating systems automatically recognize the presence of changed hardware after the operating system boots on the computer and then update or install device drivers accordingly.

The foregoing method of automatically supporting new hardware has previously been inapplicable to hardware that operates during bootup and initial execution of the operating system software. Unless the changed hardware has already been recognized and the operating system software updated accordingly, the computer is unable to boot in the first place. However, without first booting the operating system, the presence and identity of the new hardware components cannot be detected. Thus, in the past, the foregoing two requirements have been mutually exclusive, and new hardware used during the bootup process has been incompatible with methods of automatic hardware recognition and automatic configuration of the operating system. As a result, when a hard drive or a motherboard, for example, is replaced with new hardware, the user has been required to manually reconfigure the operating system. The foregoing problem has been a significant hindrance in the otherwise successful effort of minimizing administrative attention needed to replace networked computers and update hardware.

In view of the foregoing, it would be a great advancement in the art to provide a system for automatically adjusting operating system software for new hardware components, particularly those that must operate during the booting process. Furthermore, it would be a great advantage to provide network systems wherein a replacement computer or replacement hardware may be installed and automatically supported by the servers with minimal or no user or administrator attention. It would be particularly advantageous if such methods would allow a replacement computer or replacement hard disk to automatically obtain the data stored on a previous or failed computer or hard disk. Such methods and systems would significantly reduce the total cost of ownership of computers in the business setting and would reduce the administrative costs of operating computer networks.

SUMMARY AND OBJECTS OF THE INVENTION

The present invention relates to methods and systems for booting client computers over a network using operating system components provided by a server computer. According to the invention, the client computers may be booted and automatically reconfigured regardless of changes made to the hardware components of the client computer since the last time the client computer was connected to the server. When replacement hardware or an entire computer is added to the network, the client computer may be connected to the network and booted with little or no user input. Moreover, the operating system is automatically updated in response to new hardware that must be operated during the bootup process. According to the invention, the new computer or replacement hardware is treated by the servers just as the previous computer or hardware. Furthermore, if a hard disk has been replaced, the replacement hard disk automatically receives copies of information previously stored on the original hard disk. One result of the methods of the invention is that the new or modified computer is configured identically to the original computer from the point of view of the user.

According to the invention, a preliminary connection is established between the client computer and a server computer before the bootup operation is initiated. The preliminary connection is used to ensure that the operating system is properly configured and the appropriate device drivers for the critical hardware components are installed before bootup occurs.

In the preliminary connection, a globally unique identifier ("GUID") associated with the computer is transmitted from the client computer to the server. The transmitted globally unique identifier is used by the server to determine whether the particular client computer has previously accessed the network. If the server determines that the client computer is new to the network, the preliminary connection is used to ask the user whether the client computer is a new computer or a replacement computer for a previous computer. In the case where the client computer is a replacement computer, the user is prompted to identify the previous computer. In response to the information provided by the user, the server computer locates a GUID/server assignment repository containing information associating client computers with server computers. The server computer then replaces the previous computer's GUID in the GUID/server assignment repository with the replacement computer's GUID, thereby recognizing the new computer as a replacement.

During the preliminary connection, information relating to the previous hardware configuration of the client computer is transmitted from the server to the client computer. In particular, the transmitted information may relate to "critical" hardware components of the client computer, which must be properly supported in order to boot the operating system. Depending on the operating system used in the network environment, the critical hardware components may include the network interface card, the hard disk, and the motherboard.

The client computer receives the transmitted information and compares the current hardware configuration of the client computer to the previous hardware configuration. If critical hardware components of a new type are identified, and if the operating system is not yet configured to support the new critical hardware, the server installs the appropriate operating system components or device drivers. This is done, for example, by locating the appropriate operating system components or device drivers and copying them into a client operating system directory located at the server that serves the client computer. The updated operating system components and device drivers are thereby made available for transfer to the client computer.

In one implementation of the invention, the preliminary connection is used to determine whether the hard disk is a replacement, or whether the information that was contained in the hard disk of the client computer has been otherwise lost since the last time the client was connected to the server. If the hard disk information is not current, the hard disk may then be disabled during the balance of the booting process.

When the appropriate software is copied to the client operating system directory, bootup of the client computer proceeds by transmitting operating system components from the operating system directory to the client computer. These operating system components are compatible with the new hardware on the client computer such that the client computer boots with little or no user assistance. In addition, if the hard disk is new or otherwise has experienced a data loss, a backup copy of the lost data may be transferred from a storage location at the server computer to the client computer. In this manner, the client computer automatically and reliably obtains a copy of data files, application programs, and other information that were stored at the client computer when it was last connected to the server.

The invention is an advancement in the art by significantly reducing the administrative time and expense required in operating and owning computers and computer networks. When new hardware or new or replacement computers are connected to the network, the network automatically recognizes the new devices and adjusts the operating system in response thereto. If the computer fails, the replacement computer may be substituted therefor and may be operational almost immediately with minimal setup, configuration, or network adjustment.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
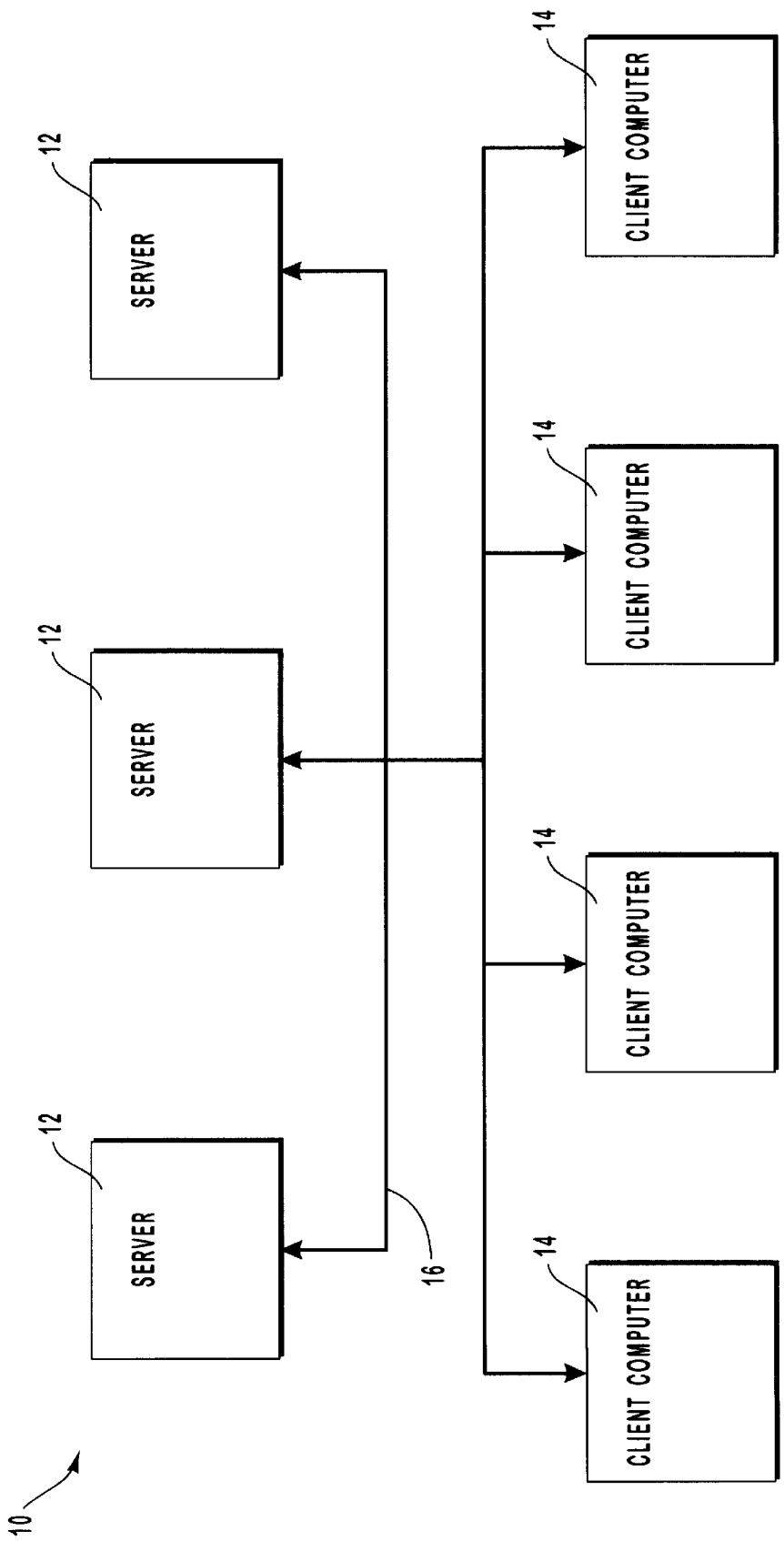
FIG. 1 is a schematic diagram of a network of the prior art including client computers and server computers.

The invention is described below by using diagrams to illustrate either the structure or processing of embodiments used to implement the system and method of the present invention. Using the diagrams in this manner to present the invention should not be construed as limiting of its scope. The embodiments of the present invention may comprise a special purpose or general purpose computer comprising various computer hardware, as discussed in greater detail below.

Embodiments within the scope of the present invention also include computer-readable media having computer-executable instructions or data fields stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. Combinations of the above should also be included within the scope of computer-readable media. Executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Moreover, those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like.

The present invention relates to methods and systems for booting a client computer over a network regardless of changes in the hardware configuration of the client computer since the last time it was connected to the server. In situations wherein critical hardware components (those that operate during bootup and initial execution of the operating system) are replaced, the server recognizes the presence of such hardware components and compensates for their presence. In cases involving the replacement of an entire client computer, the server recognizes the new computer as a replacement for the original client computer and adjusts the operating system accordingly.

In order to compensate for a new computer or new or replacement hardware, a preliminary connection is established between the client computer and the server computer before the operating system boots on the client computer. The client computer and the server computer communicate to determine whether one or more critical hardware components have been changed in the client computer since the last time it was connected to the server. If new critical hardware components are included in the client computer, the server computer identifies operating system software or device drivers that are required to support the new critical hardware. The identified operating system software or device drivers are used to update the operating system associated with the client computer. Depending on the nature of the operating system and the particular changed critical hardware components, the hard disk of the client computer may be disabled during the boot process. The operating system is then downloaded over the network and boots on the client computer.

As used herein, the term "critical hardware component" is defined as any hardware component of the client computer that must be appropriately supported by device drivers or other operating system components before or during a successful boot of the operating system on the client computer. Although specific examples of critical hardware components are presented herein, the invention is not limited thereto. In particular, the identity of the critical hardware components depends largely on the operating system used with the client computer.

The term "operating system components" refers to data fields, data structures, or computer files containing operating system software, device drivers, information relating to the hardware configuration of the client computer, and the like. According to the invention, "modification" or "modifying" operating system components may include replacing, adding, removing, updating, reconfiguring, or otherwise changing one or more individual operating system components.

Figure 2A:
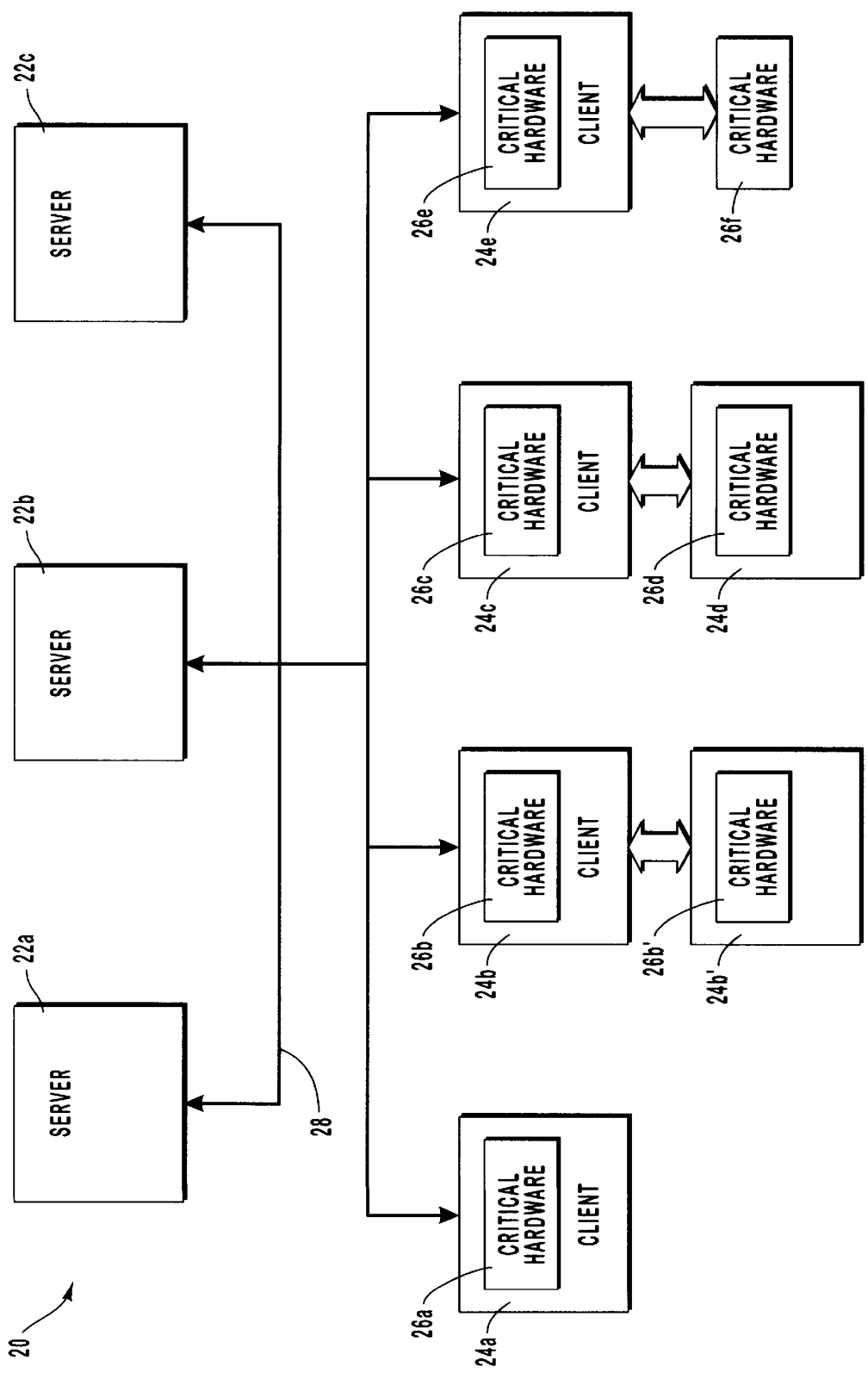
FIG. 2A is a schematic diagram of a network according to the invention, in which an entire computer or selected hardware components thereof may be replaced.
Figure 2B:
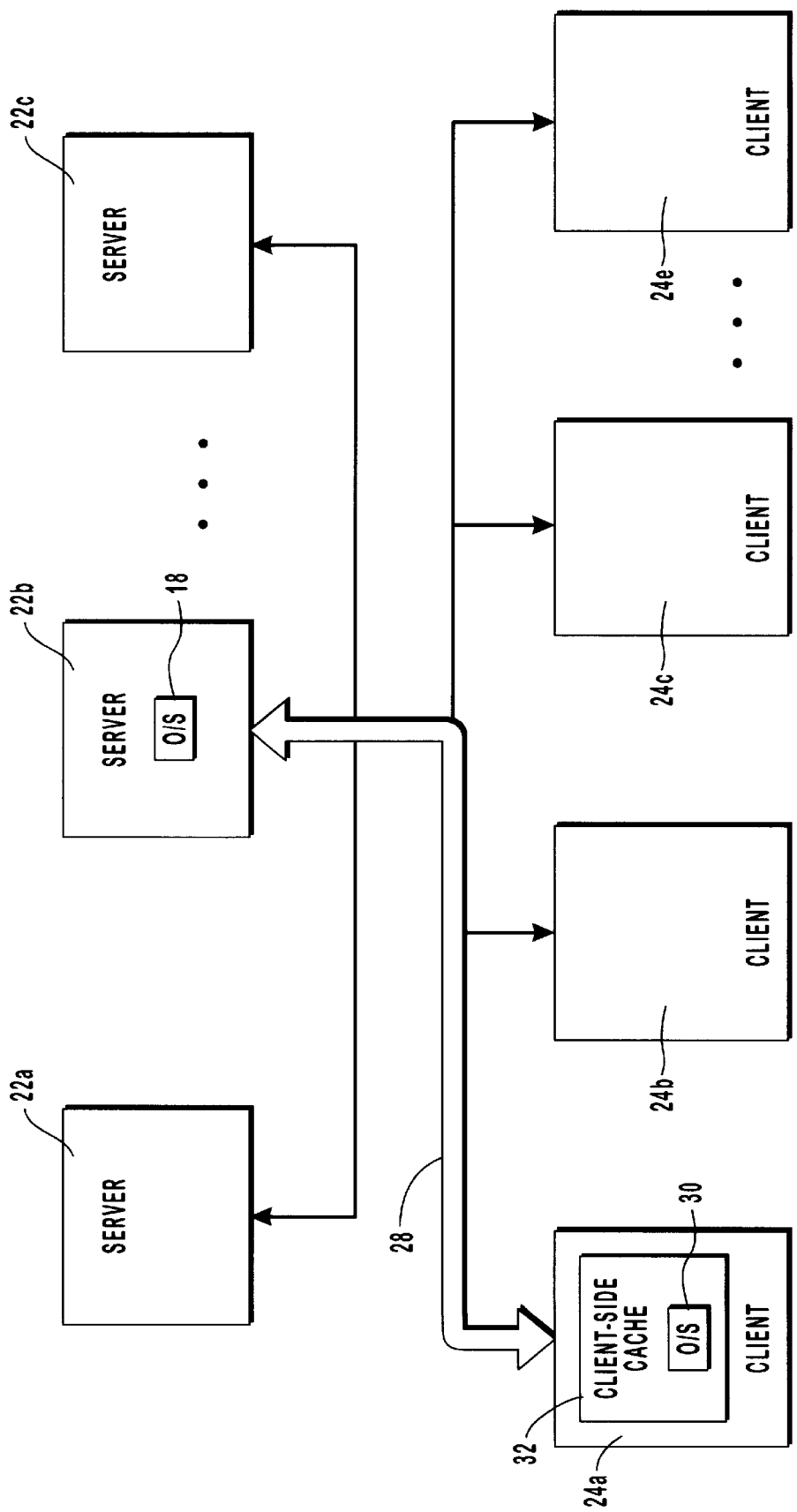
FIG. 2B is a schematic diagram of the network of FIG. 2A, further illustrating the manner in which operating system components are provided to the client computer by the server.

FIGS. 2A and 2B illustrate a network system 20 including one or more server computers 22, one or more client computers 24, and a network infrastructure 28 that establishes communication between the client computers and the server computers. Network infrastructure 28 may include cabling, transport mechanisms, routers, and other devices that establish logical connections among servers 22 and client computers 24, and other networked devices. Selected examples of replacing client computers or critical hardware components thereof are presented in FIG. 2A. In response to any of the replacement scenarios presented in FIG. 2A, servers 22 and client computers 24 are together capable of identifying the changed hardware components and modifying the operating system components with little or no user assistance.

In a first scenario, client computer 24a and the critical hardware 26a included therein remain unchanged during multiple booting operations. In a second scenario, client computer 24b, including critical hardware 26b, is replaced in its entirety with replacement client computer 24b′ including critical hardware 26b′. In this case, critical hardware 26b and replacement critical hardware 26b′ are of a similar or identical type. In a third scenario, client computer 24c, including critical hardware 26c, is replaced with replacement computer 24d, including critical hardware 26d. In this case, replacement critical hardware 26d is of a different type than original critical hardware 26c. In a fourth scenario, one or more critical hardware components 26e of client computer 24e are replaced with one or more critical hardware components 26f. In this case, replacement critical hardware 26f is of a different type than original critical hardware 26e.

In one implementation of the invention, each client computer 24 is assigned to one of the servers 22. Accordingly, when a client computer 24 is used in the network environment, a communication link or another logical connection is established between the client computer and the associated server. As seen in FIG. 2B, for example, client computer 24a could be assigned to server 22b. In this case, whenever client computer 24a is operated in the environment of network 20, it communicates with server 22b over network infrastructure 28. Furthermore, in this implementation, a first copy 18 of the operating system is stored at server computer 22b and a second copy 30 is stored in a client-side cache 32. During normal operation of client computer 24a in the environment of network 20, the client computer is booted over the network infrastructure 28. In other words, the first copy 18 of the operating system is sent to the client computer 24a over network infrastructure 28. The dual copies of the operating system provide flexibility to the client computers 24 of network 20. If the assigned server 22b fails or is otherwise unavailable, the second copy 30 of the operating system may be used to locally boot the client computer 24a. Likewise, in case of loss of data from the hard disk on which the second copy 30 of the operating system is stored, client computer 24a can boot over the network without the assistance of the hard disk.

The invention is further described herein by making reference to specific examples of booting an operating system on a client computer after critical hardware components have been replaced. It should be understood that the examples disclosed herein are representative, and are not intended to limit the scope of the invention. The invention is not limited to any particular operating systems, network architectures, communication protocols, or replaced hardware components.

Figure 3:
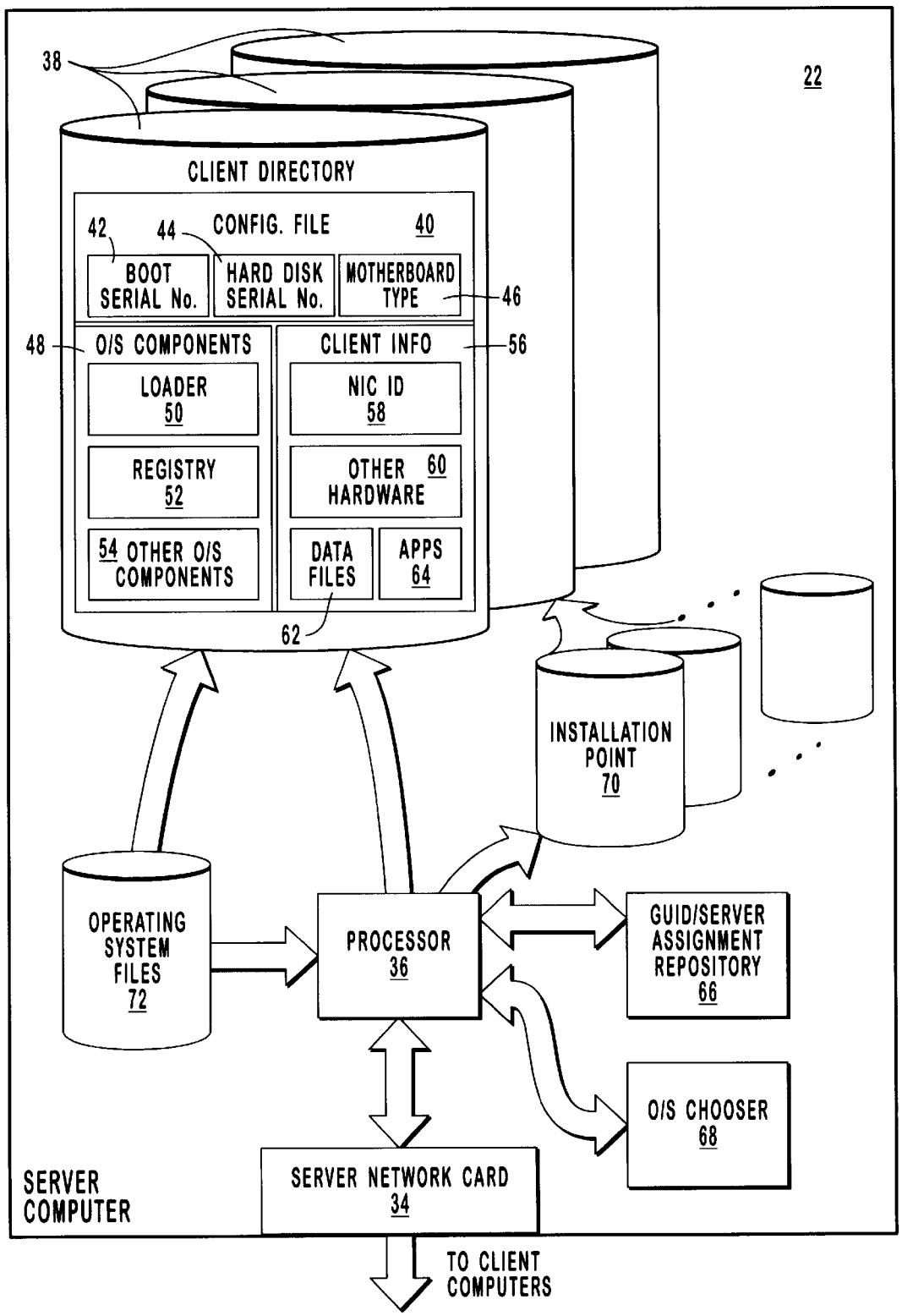
FIG. 3 is a schematic diagram of a server computer of the network of FIG. 2A, illustrating selected data structures and hardware components.
Figure 4:
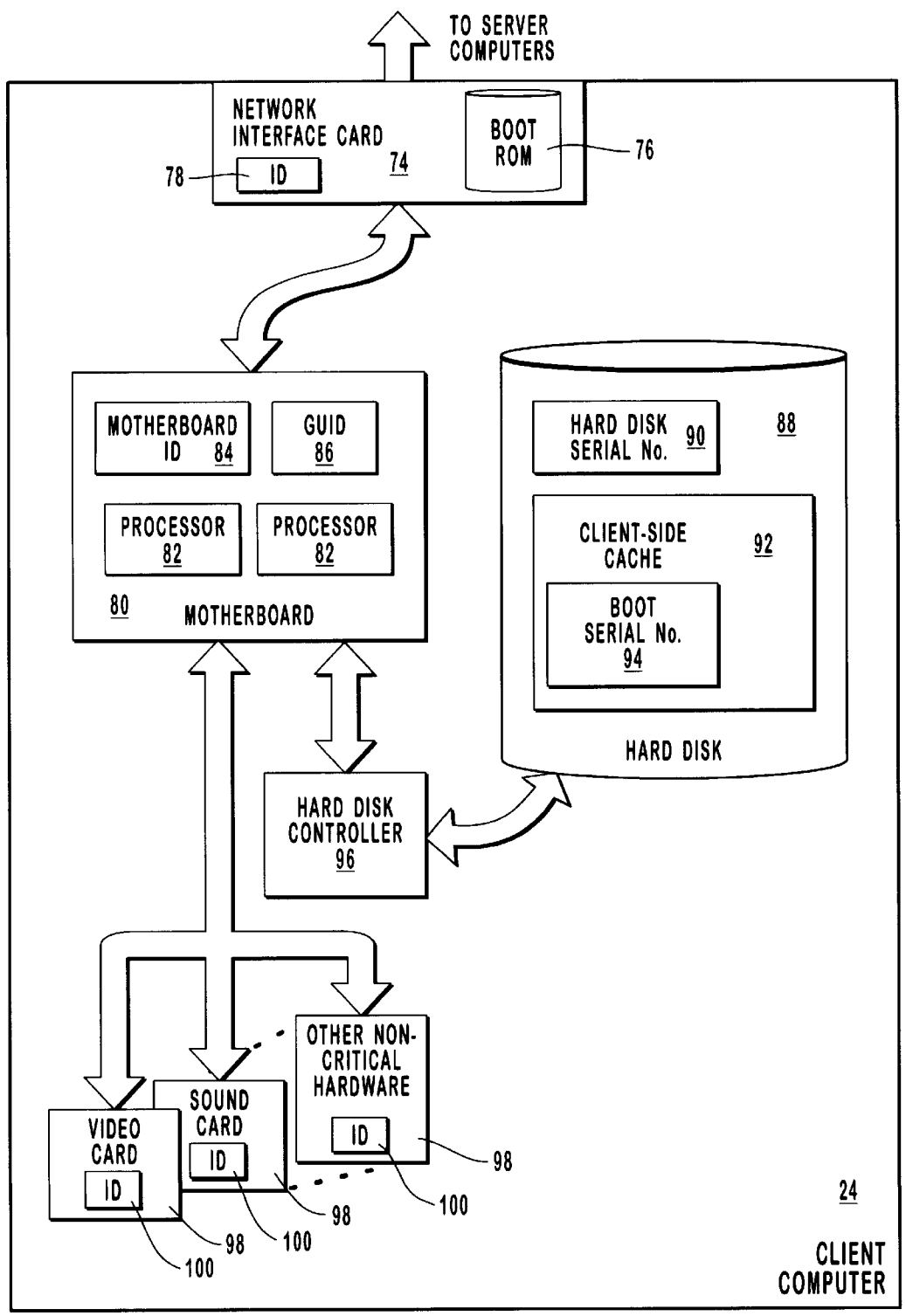
FIG. 4 is a schematic diagram of a client computer of the network of FIG. 2A, depicting selected data structures and hardware components.

FIGS. 3 and 4 illustrate examples of a server computer 22 and a client computer 24, respectively. For purposes of illustration, it is assumed that client computer 24 of FIG. 4 is assigned to server 22 of FIG. 3. Accordingly, server 22 of FIG. 3 provides the operating system components that are booted on client computer 24 of FIG. 4 and further provides the network processing resources needed to operate client computer 24 in the network environment.

In this embodiment, server 22 includes a server network card 34, such as those that are commonly used in the art to transmit data between server 22 and other computers or devices in the network. In addition, server 22 includes a processor 36 and various memory locations for storing device drivers, other operating system components and files, and other data associated with the client computers. Server computer 22 includes client directories 38, each of which is associated with one of the client computers that is assigned to the server computer. It is further assumed that the client directory 38 that is illustrated in detail in FIG. 3 is associated with client computer 24 of FIG. 4.

Client directory 38 contains several data files and executable files that are configured and updated to correspond with the critical hardware components included in client computer 24 during the most recent network connection of the client computer. It is noted that the specific contents of client directory 38 of FIG. 3 depend significantly on the features of the operating system and the types of hardware components that are considered to be "critical". In this embodiment, client directory 38 includes a configuration file 40 containing a server-side boot serial number 42, the previous hard disk serial number 44, and the previous motherboard type ID 46. The previous hard disk serial number 44 and the previous motherboard type ID 46 identify the hard disk and the motherboard of client computer 24 when it was last connected to server 22. The function of configuration file 38 is disclosed in greater detail below.

Client directory 38 also includes operating system components 48, which are specifically configured and adapted for the hardware configuration of the assigned client computer 24. The operating system components 48 include a loader 50, a registry 52, and other operating system components 54. The functions of the loader 50 and registry 52 are disclosed in greater detail below. In this embodiment, one example of a suitable operating system for use with the present invention is Windows NT, manufactured by Microsoft Corporation of Redmond, Wash. Accordingly, the examples of the methods and systems of the invention disclosed herein are compatible with Windows NT. Other operating systems also have similar components and may be used in conjunction with the invention in substantially the same way as Windows NT. For example, Windows NT and other operating systems operate in the network environment such that the network interface card, the hard disk, and the motherboard are critical hardware components. In order to successfully boot these operating systems, they must be appropriately configured and adapted to support the foregoing critical hardware components.

Still other operating systems function in the network environment in different ways. For example, other operating systems have different corresponding "critical" hardware components than those disclosed herein in reference to Windows NT. In these cases, the operating systems and device drivers are adjusted to compensate for the specific critical hardware components of each particular case. Although the specific critical hardware components may be different from those that correspond to Windows NT or some other operating systems, those skilled in the art, upon learning of the invention disclosed herein, will understand which hardware components are deemed "critical" and how to compensate for changed critical hardware components.

In this embodiment, client directory 38 further includes client information 56, which may comprise a previous network interface card ID 58, other hardware ID 60, data files 62, and applications 64. Previous network interface card ID 58 identifies the network interface card (a critical hardware component in this embodiment) that was included in the client computer 24 when it was last connected to the network. Likewise, other hardware ID 60 corresponds to non-critical hardware components previously included in client computer 24. Data files 62 and applications 64 contain computer-executable instructions and data structures associated with client computer 24, and copies of these files may also be stored on client computer 24 during normal operation of the network.

GUID/server assignment repository 66 contains information regarding the assignment of client computers 24 to server computers 22. In one embodiment of the invention, server computer 22 further has stored therein an operating system chooser 68, which is an executable software program further described herein. Installation point 70 is a repository containing various device drivers and operating system components that may be selected and installed to support any of a number of new or replacement hardware components of client computer 24. It is noted that each server 22 may access different installation points for different client computers. Operating system files 72 is yet another repository containing portions of the operating system that are standard and applicable to client computers 24 having any type of hardware. Server computer 22 may have only one copy of operating system files 72 to support multiple assigned client computers 24. In this case, memory resources are conserved, because the standard and universally applicable portions of the operating system are not duplicated in each of the plurality of client directories 38. Thus, the portions of the operating system that are specifically applicable to a particular client computer 24 are stored in operating system components repository 48, while the generally applicable portions are stored in operating system files repository 72. Alternatively, however, each client directory may include a complete copy of the operating system in operating system components repository 48, such that a separate operating systems files repository 72 is not needed.

Client directories 38, GUID/server assignment repository 66, operating system chooser 68, installation point 70, and operating system files repository 72 may be physically located in one or more memory devices in server computer 22. Alternatively, at least some of the foregoing elements may instead be located at a remote site, such as another server computer. For example, installation point 70 may be located at another server and accessed by server computer 22 via the network infrastructure.

FIG. 4 illustrates selected components of the client computer that is assigned to server computer 22 of FIG. 3. The critical and non-critical hardware components of client computer 24 may be of any type and source that are compatible with operating system used in the network. Indeed, the ability to recognize and adjust for any of the wide range of new or replacement hardware components is one of the advantages of the present invention. Client computer 24 has a network interface card ("NIC") 74, such as those that are typically used in the art to establish communication between the client computer and other devices in the network. Network interface card 74 typically includes a boot ROM 76 and a NIC ID 78. Boot ROM 76 includes computer-executable code for initially communicating over the network infrastructure before the operating system boots on client computer 24. NIC ID 78 is a digital code that identifies network interface card 74 sufficiently to at least distinguish it from other types of network interface cards.

Motherboard 80 may be either a single-processor or multi-processor device, and accordingly includes one or more processors 82. A motherboard ID 84 identifies the motherboard type (i.e., single- or multi-processor, speed, manufacturer, etc.). GUID 86 is a globally unique identifier that uniquely distinguishes client computer 24 from all other computers. Currently, GUID 86 is ordinarily encoded on a read-only memory device of the client computer. However, as disclosed below in greater detail, GUID 86 may instead be any other identifier and encoded on another component of the client computer.

Hard disk 88 includes a disk serial number 90 that uniquely identifies the particular hard disk from other hard disks. A client-side cache 92 may be stored on hard disk 88, and may contain a copy of the information stored in the corresponding client directory 38 of FIG. 3. Client-side cache 92 also includes a client-side boot serial number 94. A primary purpose of client-side boot serial number 94 and the corresponding server-side boot serial number 42 is to detect when local hard disk 88 is out of date with respect to the server computer and is not to be used during a current booting operation. If, during the last time that client computer 24 booted with access to server computer 22, the client computer also had access to local hard disk 88, client-side boot serial number 94 will be equal to server-side boot serial number 42. In particular, server-side boot serial number 42 is incremented each time that client computer 24 boots with access to server computer 22. Subsequently, if client computer 24 also has access to local hard disk 88, client-side boot serial number 94 is synchronized over the network with server-side boot serial number 42.

However, there are at least two results when local hard disk 88 has been inaccessible by client computer 24 during the most recent connection to server computer 22. First, client-side boot serial number 94 is not synchronized with server-side boot serial number 42. Second, the information in client-side cache 92 is not updated, and is presumably out of date with respect to server computer 22. Thus, a client-side boot serial number having a value less than the server-side boot serial number indicates that the client-side cache is not current and is not to be used during the current booting operation. Specific examples of comparing the values of the two boot serial numbers are presented below in reference to FIGS. 6–9.

FIG. 4 further illustrates non-critical hardware components of client computer 24, including a hard disk controller 96, which is a device that interfaces with and operates hard disk 88. Other non-critical hardware components 98, such as a video card, a sound card, and peripheral devices, may also be included in client computer 24. Technically, video cards may be considered "critical" hardware components. However, for purposes of illustration, the video card is classified with the non-critical components, since all currently-used video cards are addressed according to a baseline standard, which the operating system can fall back to during the bootup process. When a replacement or new video card is included in a client computer, the associated driver may be configured during a later plug and play process. Non-critical hardware components 98 may have identifying information 100 that specifies the version, manufacturer, etc., of the hardware device.

In a Windows NT environment, the critical hardware components include network interface card 74, motherboard 80, and hard disk 88. In order to successfully boot Windows NT on client computer 24, the operating system generally must be configured and adjusted to support the foregoing hardware components. The present invention compensates for changed critical hardware components and automatically installs the appropriate device drivers and configures the operating system software with little or no user assistance. As mentioned previously, other operating systems may have other corresponding critical hardware components. However, the invention is equally applicable in such cases, and may be used to recognize and compensate for substantially any type of new or replacement critical hardware components. The elements and components of server computer 22 and client computer 24 will be further described in reference to specific examples of the methods of the invention.

Figure 5:
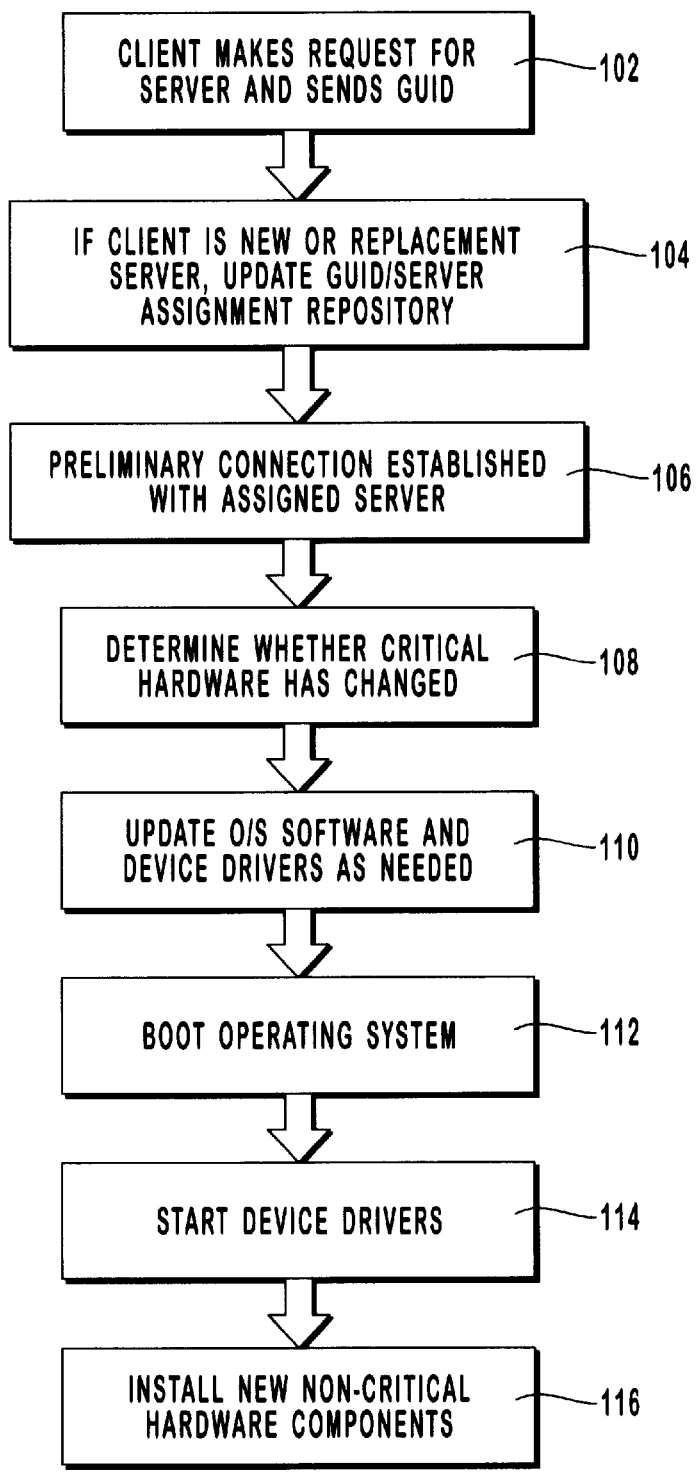
FIG. 5 is a flow diagram generally depicting selected steps of a method of the invention for recognizing new hardware components and adjusting the operating system before booting the operating system on the client computer.

In view of the foregoing examples of client computers and server computers, FIG. 5 is a flow chart depicting high-level steps in a general embodiment of the methods of the invention. In step 102, the client computer makes an initial request for a server by, for example, sending its GUID over the network and requesting the network address of the server to which it is assigned. Step 104 relates to one aspect of the invention, in which it is determined whether the client computer previously has been connected to the network, and if not, whether the client computer is a new computer or a replacement for a previous computer. The determination as to whether the client computer previously connected to the network can involve comparing the client computer's GUID against information stored in a GUID/server assignment repository accessible by the server computer. In step 104, if the client computer is a new or replacement computer, the GUID/server assignment repository is updated as needed to assign the new or replacement computer to a server.

It is noted that the methods of adjusting the operating system for new or replacement hardware may be practiced with or without step 104, which relates to methods for recognizing a client computer as being new or a replacement, and assigning the client computer to a server computer. Likewise, the method of step 104 may be practiced in the absence of much of the remainder of the subject matter disclosed herein. However, combining the methods of adjusting the operating system for new or replacement hardware and recognizing a client computer as being new or a replacement significantly reduces the administrative effort and attention that would otherwise be required.

In step 106, the client computer establishes a preliminary connection with the assigned server computer, without yet booting the operating system. At this stage of the method, before the operating system boots, it is determined in step 108 whether the critical hardware of the client computer has changed since the last time the client computer connected to the server. In step 110, the server computer identifies the operating system components or device drivers needed to support any changed critical hardware components and makes them available to the client computer. The updated operating system is then booted on the client computer according to step 112.

After initial bootup of the operating system, step 114 is conducted, in which device drivers supporting critical and non-critical hardware components are started. According to an optional final step 116, "plug and play" may be conducted with respect to new or replacement non-critical hardware components. In particular, the device drivers that support any new or replacement non-critical hardware may be automatically installed and started so that the client computer is fully operational with little or no user assistance.

The method of FIG. 5 may be further understood by making reference to FIGS. 6–9, which depict specific examples of the methods and systems of the invention, and correspond generally to the four replacement scenarios illustrated in FIG. 2A. Again, the examples of FIGS. 6–9 are directed to a network environment supported by Windows NT or other operating systems that result in similar critical hardware components. The examples are discussed below with respect to the flow diagrams of FIGS. 10A–13, which illustrate in greater detail the steps conducted according to these embodiments of the invention.

It is also noted that the architecture of the networks, the protocols used to communicate between client computers and servers, and the hardware components used to establish the connection between the client computers and the servers need not be the same as those disclosed in the examples below. The factors that influence the selection of the communication protocols and the hardware components of any particular embodiment include industry standards and the configurations that are compatible with the particular network and the networked computers. Thus, the invention may be practiced using any of a large number of communications protocols and hardware components beyond those that are specifically disclosed in the following examples.

The specific examples are described below by referring to tasks and actions performed by the client computers, such as requesting data from a server or interpreting data retrieved from the server. In order to perform steps of the invention, the client computer executes code included in the boot ROM, in the loader downloaded from the server, in the operating system software, or in other files or modules as described in examples below. As used in the following description and the appended claims, the client computer may be described as performing the tasks or actions, regardless of the source of the enabling executable code.

EXAMPLE 1

Figure 6:
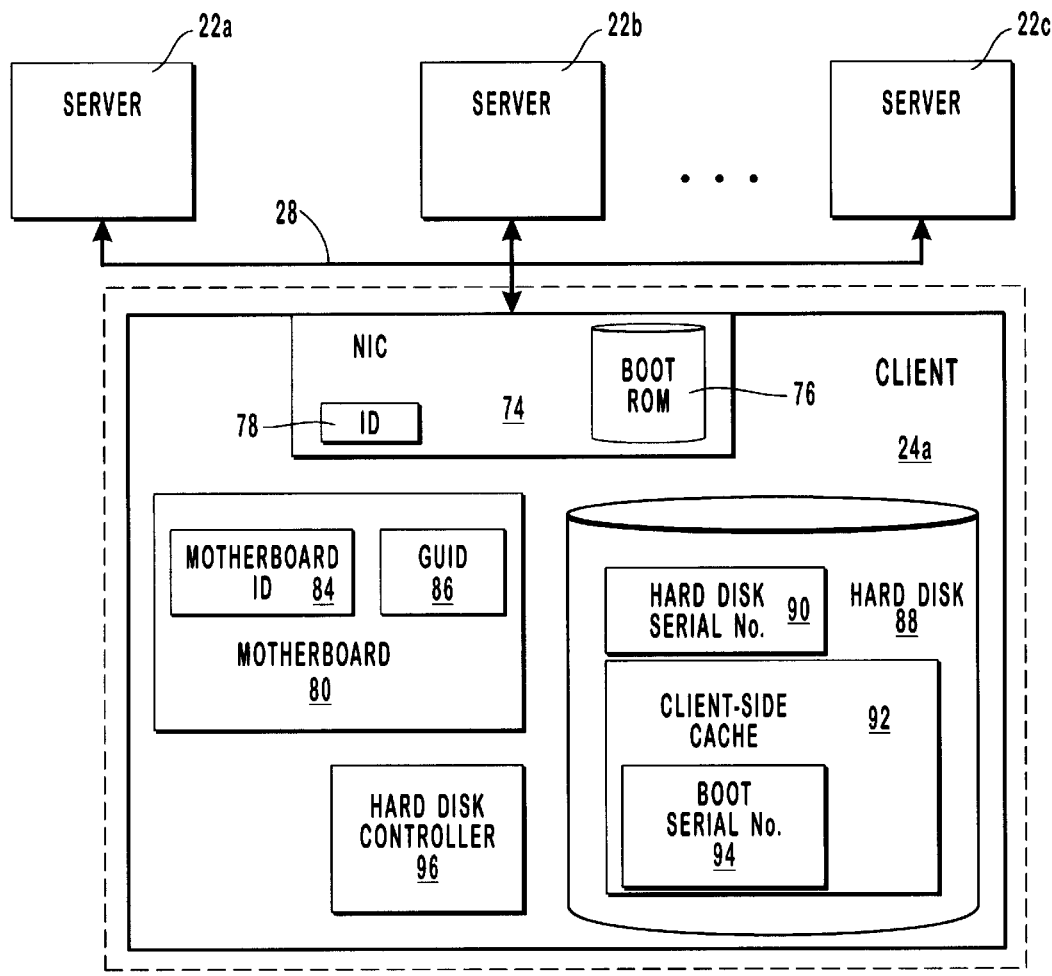
FIG. 6 is a schematic diagram illustrating a client computer repeatedly connected to the network without a hardware reconfiguration.

FIG. 6 illustrates a client computer that remains unchanged during multiple connections to the assigned server computer. In this example it is assumed that client computer 24a has previously connected to the assigned server 22 over network infrastructure 28, using the same hardware that remains in the client computer. In step 120 of FIG. 10A, client computer 24a initiates a request for a network server. For example, network interface card 74 may transmit data over network infrastructure 28 that is understood by the servers as a request for the network address of the particular server that is assigned to client computer 24a. In one implementation, boot ROM 76 provides the communications protocol that is used to send the server request over the network. Furthermore, in order to identify client computer 24a, the server request of step 120 may include a copy of GUID 86. Any of the servers 22 may respond to the server request by comparing the GUID 86 of client computer 24a to information stored in a GUID/server assignment repository 66 of FIG. 3, which associates the client computers with the assigned servers. In this example, since client computer 24a has previously connected to the assigned server, GUID 86 is included in GUID/server assignment repository 66. For purposes of illustration, it may be assumed that client computer 24a is assigned to server 22b in this example. Thus, according to decision block 122, GUID 86 is recognized, and the method continues to step 124.

In step 124, the assigned server responds to client computer 24a. In step 126, client computer 24a, using executable code in boot ROM 76, requests loader 50 from the server. Loader 50 includes computer-executable instructions that, when executed by client computer 24a, requests additional executable instructions and other data from the server and loads them into a memory device at the client computer for later execution and/or retrieval. In response to the request, the server sends loader 50 to client computer 24a as illustrated by step 128.

Loader 50 then establishes a preliminary connection between client computer 24a and server 22b, whereby the additional executable instructions and other data may be transferred between the client computer and the server computer using Trivial File Transfer Protocol ("TFTP") or another communication protocol. The connection is preliminary in the sense that it is established without the operating system having yet been booted on client computer 24a. In addition to using TFTP to transfer files between client computer 24a and server 22b, the preliminary connection is supported by a BINL communication protocol according to one embodiment.

Client computer 24a, using loader 50, then requests and receives registry 52 and configuration file 40 from the server as illustrated by step 130. Registry 52 includes a list of files and executable operating system software that client computer 24a is to request from the assigned server and further includes a copy of previous NIC ID 58. In this example, configuration file 40 contains server-side boot serial number 42, the previous hard disk serial number 44 and the previous motherboard type ID 46, which have been described herein in reference to FIG. 3. This and other data that may be included in configuration file 40 is interpreted by executable-instructions at client computer 24a to prepare the client computer to boot the operating system and otherwise fully connect to the assigned server as described in greater detail below.

Next, in step 132, client computer 24a detects its client-side boot serial number 94, hard disk serial number 90, motherboard type ID 84, and NIC ID 78 in preparation for later comparing them with the corresponding server-side information contained in configuration file 40. It is noted that since client computer 24a has previously connected to the assigned server using the same hardware that is presently included therein, the boot serial numbers 42 and 94, the hard disk serial numbers 44 and 90, and the motherboard type IDs 46 and 84 will be identical with each other.

In the present example, according to decision block 134, server-side boot serial number 42 is not greater than client-side boot serial number 94. Accordingly, it is assumed that client-side cache 92 is current and the method proceeds to step 136 of FIG. 10B. The manner in which the methods and systems of the invention respond to non-synchronized boot serial numbers is disclosed in greater detail in other examples below.

The motherboard type IDs 46 and 84 are used to determine whether the motherboard type has changed since the last time client computer 24a was connected to the network. If it is determined that motherboard 88 is new, the previous operating system configuration may not be compatible with the new motherboard. For example, many operating systems have one version for a single-processor motherboard and another version for multiple-processor systems. The manner in which the methods and systems of the invention respond to replacement motherboards is disclosed in greater detail in other examples below. In this example, however, the motherboard type IDs 46 and 84 are identical and, according to decision block 136, the method continues at step 138.

The hard disk serial numbers 44 and 90 are used to determine whether a replacement hard disk has been included in client computer 24a since it was last connected to the assigned server. If it is determined that the hard disk 88 is new, client-side cache 92 is assumed to be empty or otherwise not current, and is not to be used to boot the operating system on client computer 24a. The manner in which the methods and systems of the invention respond to replacement hard disks is disclosed in greater detail in other examples below. In the present example, however, the hard disk serial numbers 44 and 90 are the same, and the method proceeds from decision block 138 to decision block 146.

Current network interface card ID 78 and the previous network interface card ID 58 are used to determine whether the NIC in client computer 24a has been replaced since the last time the client computer connected to the assigned server. If so, the previous configuration of the operating system may not support the replacement NIC. In the present example, client computer 24a has already requested and received registry 52, which includes a copy of previous NIC ID 58. Client computer 24a then compares the current NIC ID 78 to the previous NIC ID 58 to determine whether network interface card 74 is of a different type than the network interface card previously included in the client computer. According to decision block 146, it is recognized that NIC ID 78 is the same as previous NIC ID 58, and the method moves to step 148. The manner in which the methods and systems of the invention respond when the network interface card IDs are not the same is disclosed in greater detail in other examples below.

At this stage of the method, any replacement critical hardware components of client computer 24a have been identified, and it has been verified that the operating system is configured to support the critical hardware components. Since client computer 24a remains unchanged since the last time it was connected to the assigned server, the previous operating system configuration remains compatible with the client computer, and client-side cache 92 is assumed to be current. In step 148, the server downloads the appropriate operating system components to client computer 24a. This download may be initiated, for example, during a process in which client computer 24a walks through an operating system file list of registry 52 and requests the files listed therein. Optionally, since client-side cache 92 is current in this example, the operating system components and other data may be obtained from local hard disk 88 instead of from the server computer, thereby reducing, server and network infrastructure loads.

According to step 150, the operating system boots on client computer 24a. Because client-side cache 92 is current, hard disk 88 may be used to boot the operating system and later to continue executing the operating system and to support the activities of client computer 24a. During the preceding steps of this example of the method, the server has compiled a change list containing changes that have occurred with respect to the information stored in registry 52. In step 152, the client computer updates registry 52 as needed, thereby ensuring that it contains current information.

Figure 10A:
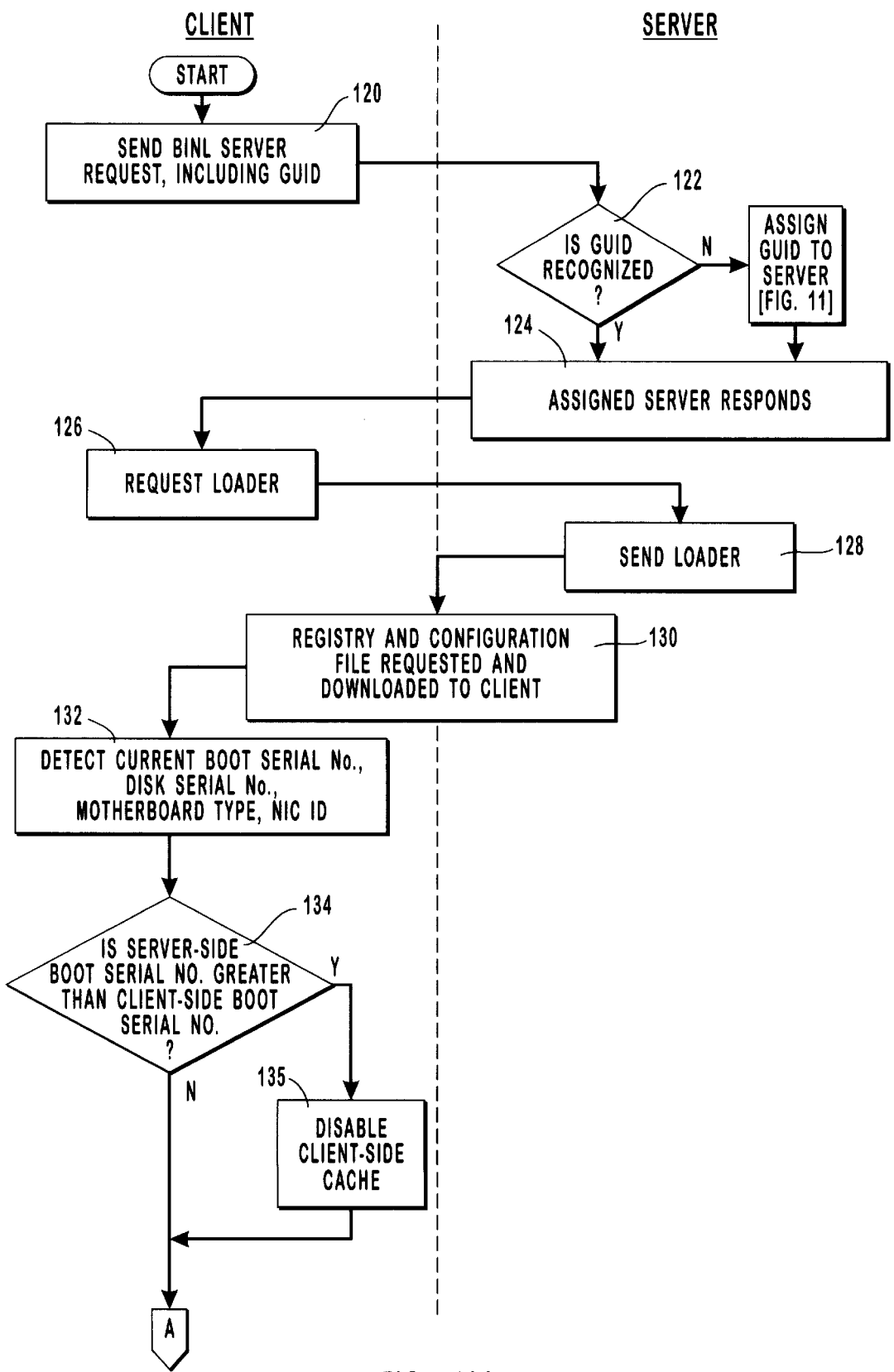
FIGS. 10A–10C include a flow diagram illustrating the steps of one embodiment of a method for recognizing new hardware components and booting an operating system on the client computer over a network.
Figure 10B:
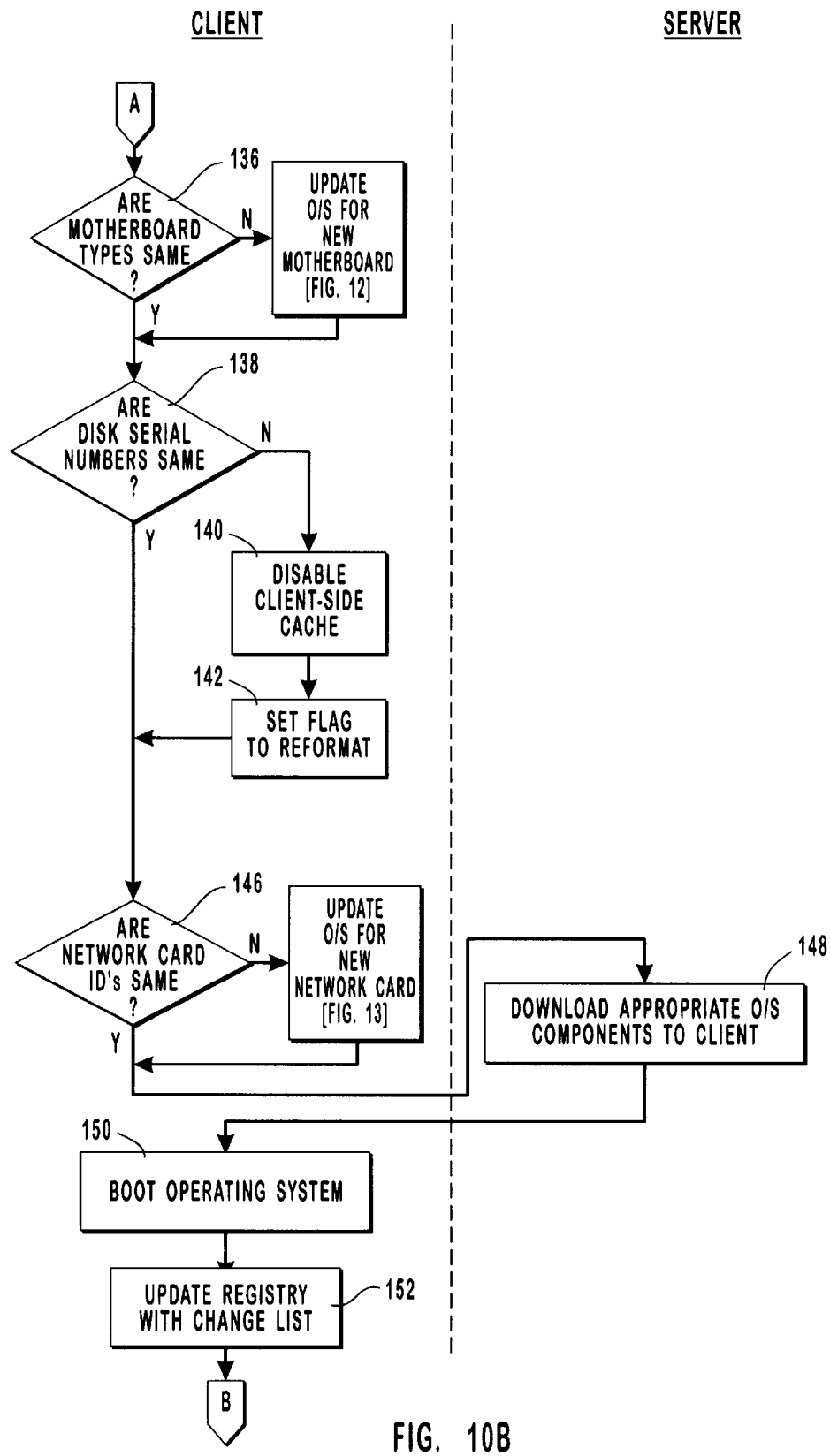
Figure 10C:
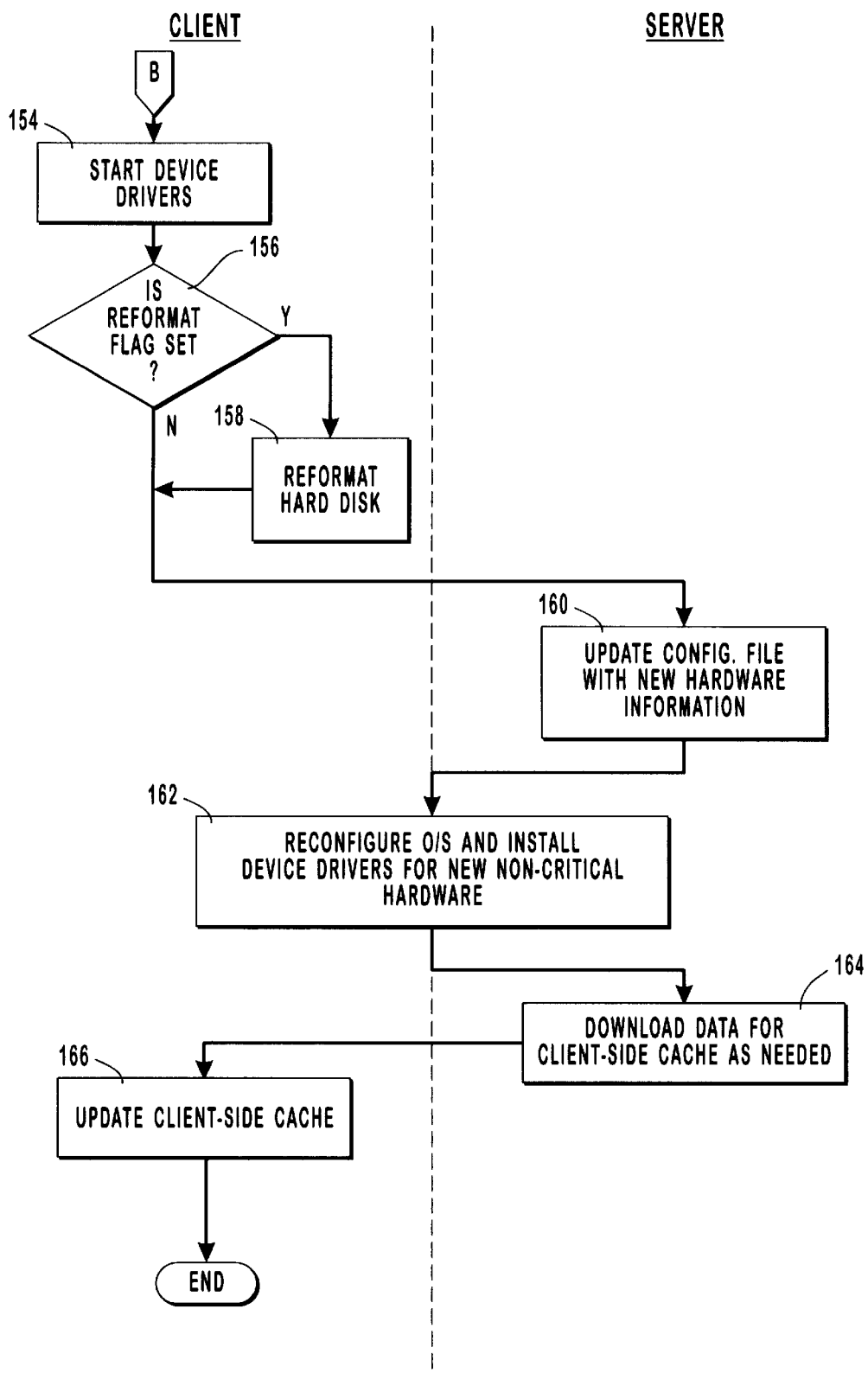

Next, in step 154 of FIG. 10C, client computer 24a starts the device drivers that support its critical and non-critical hardware components. According to decision block 156, the client computer determines whether a flag, which indicates that hard disk 88 should be reformatted or repartitioned or that client-side cache 92 should be cleared, was set during the earlier stages of the method. In this example, the flag has not been set, and the method advances to step 160, in which the server increments server-side boot serial number 42 and updates hard disk serial number 44 and motherboard type ID 46 as needed. The client-side boot serial number 94 is also synchronized with the value of server-side boot serial number.

Optional step 162 further streamlines the process of replacing hardware components or entire computers on the network. According to step 162, client computer 24a and the assigned server computer communicate with each other to identify any replacement or new non-critical hardware components. If any are present, the appropriate device drivers may be identified and installed with little or no user assistance according to a process known in the industry as "Plug and Play".

At some point after the operating system has booted on the client computer, the server downloads information to client computer 24a as needed in order to update client-side cache 92 as illustrated by step 164. According to step 166, the downloaded information is then stored in client-side cache 92. In one embodiment of the invention, client-side cache 92 contains the same information, data files, and computer-executable code that is stored in the corresponding client directory 38 of FIG. 3. Accordingly, client-side cache 92 may be repeatedly compared to client directory 38 and updated to ensure that it continues to be a mirror of the client directory. Providing dual copies of the operating system files, data files, applications, etc., allows client computer 24a to use exclusively either client-side cache 92 or client directory 38 if the other one of these two memory locations is temporarily unavailable.

The foregoing method and system of FIG. 6 illustrate one example of the manner in which the invention may be used to identify the critical hardware components of the client computer and to boot the operating system on the client computer. In particular, the client computer, with the assistance of the server computer, has verified that its hardware components are the same as those previously included in the client computer the last time it was connected to the server.

EXAMPLE 2

Figure 7:
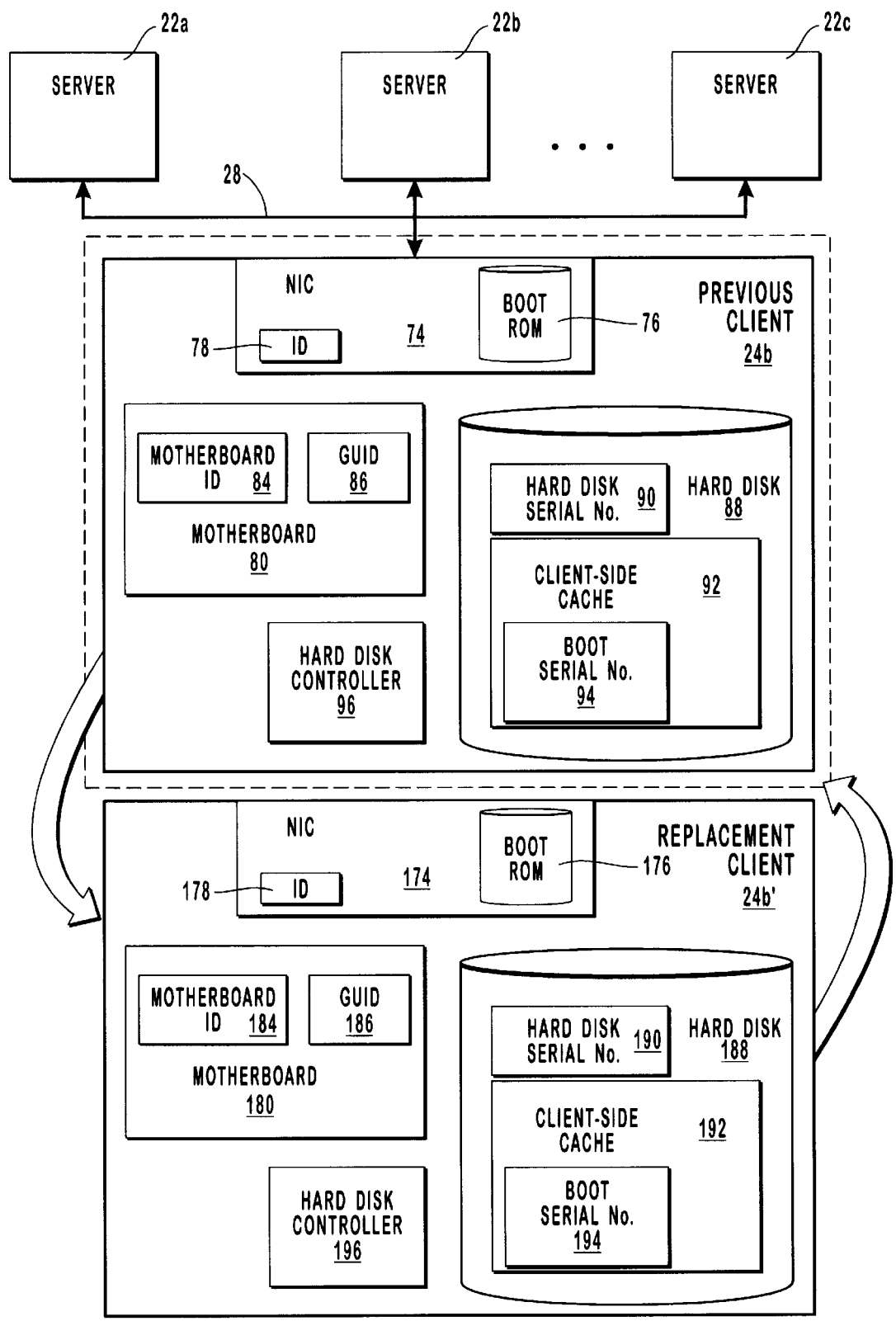
FIG. 7 is a schematic diagram illustrating the replacement of an original client computer with a replacement computers wherein the hardware of the original client computer and the hardware of the replacement client computer are of the same type.

FIG. 7 depicts in greater detail the second replacement scenario of FIG. 2A, wherein client computer 24b is replaced in its entirety by replacement client computer 24b'. Moreover, the replacement critical hardware in replacement client computer 24b' is of the same type as the previous critical hardware in client computer 24b. In this example, the replacement hardware components illustrated in FIG. 7 include a network interface card 174, a motherboard 180, a hard disk 188, and a hard disk controller 196. Of the foregoing hardware components, all are considered to be "critical" in this example, except hard disk controller 196.

Turning to the method illustrated in the flow diagrams of FIGS. 10A–10C and 11–13, replacement client computer 24b' sends a server request in step 120 as described above in reference to Example 1. In this example, however, GUID 186 is not located by the server in GUID/server assignment repository 66. Accordingly, in decision block 122 of FIG. 10A, GUID 186 is not recognized, and the method moves to step 202 in the flow diagram of FIG. 11. The sub-routine of FIG. 11 generally corresponds to step 104 of FIG. 5, in which a new or replacement computer is recognized by the server, which then updates GUID)/server assignment repository 66. This sub-routine allows a new or replacement computer to be rapidly and easily assigned to a server with only a small amount of user input.

Because client computer 24b' has not previously been connected to the network and replacement GUID 186 was not located in GUID/server assignment repository 66, client computer 24b' has not yet been assigned to a particular server. Accordingly, any of the servers of the network may respond to the server request of step 120 and proceed through the sub-routine of FIG. 11. In step 202, the server requests the administrative authorization from the user of client computer 24b' in order to verify that the user is authorized to add or replace a client computer. In step 204, the user enters a password or other authorization code, or the user is otherwise verified as having a certain level of administrative authorization. Based on the user authorization, according to step 206, the server compiles an option list that, in this example, allows the user to indicate whether client computer 24b' is a replacement for a previous computer or is entirely new to the network. In other embodiments, depending on the network architecture, the intended use of the client computer, and the user authorization, the option list may present additional choices. In another embodiment, the administrator can configure the system to automatically recognize client computer 24b' as a replacement.

The user makes a selection from the option list in step 208. In this example, the user selects the replacement computer option. Thus, since client computer 24b' is a replacement for previous client computer 24b, the method proceeds from decision block 210 to step 212. Next, according to step 212, the user of client computer 24b' sends information that identifies previous client computer 24b. For example, the user may enter a user-friendly name associated with previous client computer 24b, such as a user account name for the user of the previous client computer. Alternatively, the identifying information sent in step 212 may be any other information that uniquely identifies previous client computer 24b, such as previous GUID 86.

In step 214, the server computer locates previous GUID 86 associated with previous client computer 24b in the GUID/server assignment repository 66. Next, the server replaces previous GUID 86 with replacement GUID 186 according to step 216, thereby effectively recognizing that client computer 24b' is a replacement for previous client computer 24b. Furthermore, client computer 24b' is now assigned to a server and is associated with the client directory 38 of FIG. 3 that had previously corresponded to client computer 24b. Referring again to decision block 210, it is noted that if client computer 24b' had instead been a new computer, the method would have moved to step 218, wherein the new computer would have been assigned to a server. In either case, once the sub-routine of FIG. 11 has been performed, the client computer, whether new or a replacement, has been assigned to an appropriate server.

Returning now to FIG. 10A, steps 124, 126, 128, 130, and 132 are conducted in substantially the same way as described above in reference to Example 1. Since hard disk 188 is new, the hard disk either does not yet have a client-side boot serial number or may have an old client-side cache and client-side boot serial number. In either case, it is assumed that the information on hard disk 188 is unreliable. In one embodiment, client-side cache 192 may be immediately disabled and a flag may be set to request a later reformat of the hard disk without having to execute decision blocks 134 and 138, since it is known that hard disk 188 contains unreliable information. For example, steps similar to steps 140 and 142 may be conducted to disable client-side cache 192 and to set the flag. In another embodiment, however, the method may proceed normally through decision block 134 to step 135 and later from decision block 138 to steps 140 and 142, in which client-side cache 192 is disabled such that it will not be used to boot the operating system.

Decision block 136 is answered affirmatively in this example, since replacement motherboard ID 184 is the same as previous motherboard ID 84 (i.e., the replacement and previous motherboards are of the same type). Assuming that client-side cache 192 has previously been disabled and that decision block 138 is to be skipped as described above the method proceeds to decision block 146, which is conducted in substantially the same way as disclosed herein in reference to Example 1. In this example, replacement NIC ID 178 is the same as previous NIC ID 78, due to the assumption that replacement network interface card 174 and previous network interface card 74 are of the same type. At this point, the critical hardware components have been checked sufficiently to verify that the operating system is in condition to boot on client computer 24b'. Steps 148 and 150 are then conducted as described above in reference to Example 1, with the exception that the operating system boots without hard disk 188 being involved. The appropriate operating system components are downloaded to client computer 24b' and executed thereon.

Next, steps 152 and 154 are conducted as described above in reference to Example 1. According to decision block 156, the presence of the flag is recognized, and the method advances to step 158, wherein hard disk 188 is reformatted or repartitioned or client-side cache 192 is cleared. The choice among the foregoing options of reformatting, repartitioning, or clearing may be based on an expressly-selected or default setting of the operating system. In the subsequent step 160, configuration file 40 is updated to include the replacement hard disk serial number 190 and to increment the server-side boot serial number 42. Next, the optional step 162 may be conducted as described above in reference to Example 1. According to steps 164 and 166, the appropriate data is eventually downloaded to client computer 24b' in order to update client-side cache 192. Thus, client-side cache 192 now contains a current copy of the information stored in the corresponding client directory 38.

The foregoing example illustrates one method whereby a replacement client computer is recognized as such, and the GUID/server assignment repository is updated to assign the replacement client computer to the appropriate server. This portion of the method of the invention requires only a minimal amount of user input to configure the network to respond to the replacement computer as it did to the previous client computer. Moreover, the critical hardware components are checked to determine whether their type has changed in order to verify the compatibility of the operating system, and to determine whether the hard disk should be disabled during the process of booting the operating system. This portion of the method of the invention allows the replacement client computer to begin operating with little or no user assistance.

EXAMPLE 3

Figure 8:
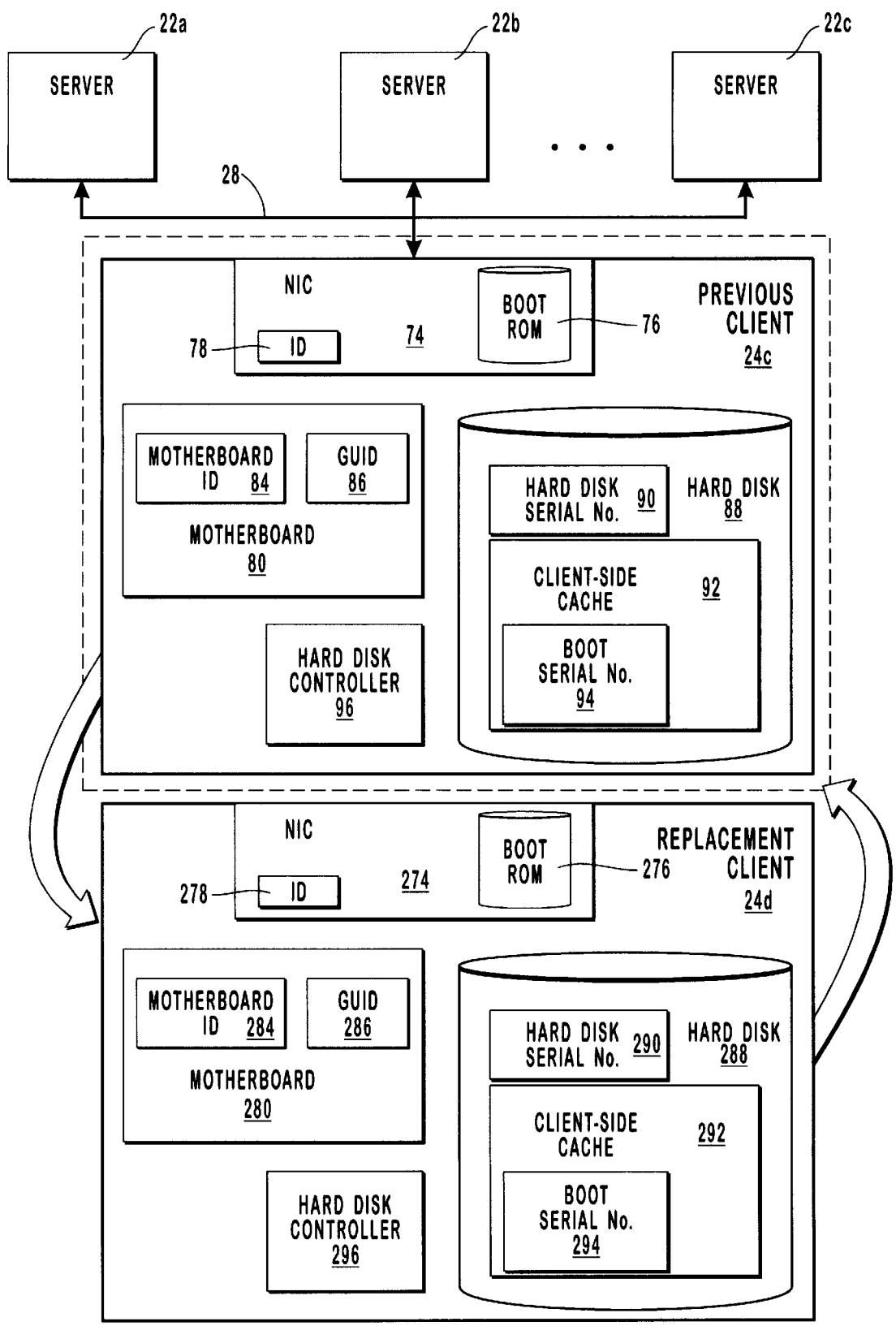
FIG. 8 is a schematic diagram illustrating the replacement of an original client computer with a replacement computer, wherein the hardware of the original client computer and the hardware of the replacement client computer are of different types.

FIG. 8 illustrates the replacement of a previous client computer with a replacement client computer, including critical hardware components of a different type than the previous critical hardware components. In particular, in this example, it is assumed that network interface card 274, motherboard 280, and hard disk 288 are of different types than the corresponding hardware components of previous client computer 24c.

Figure 11:
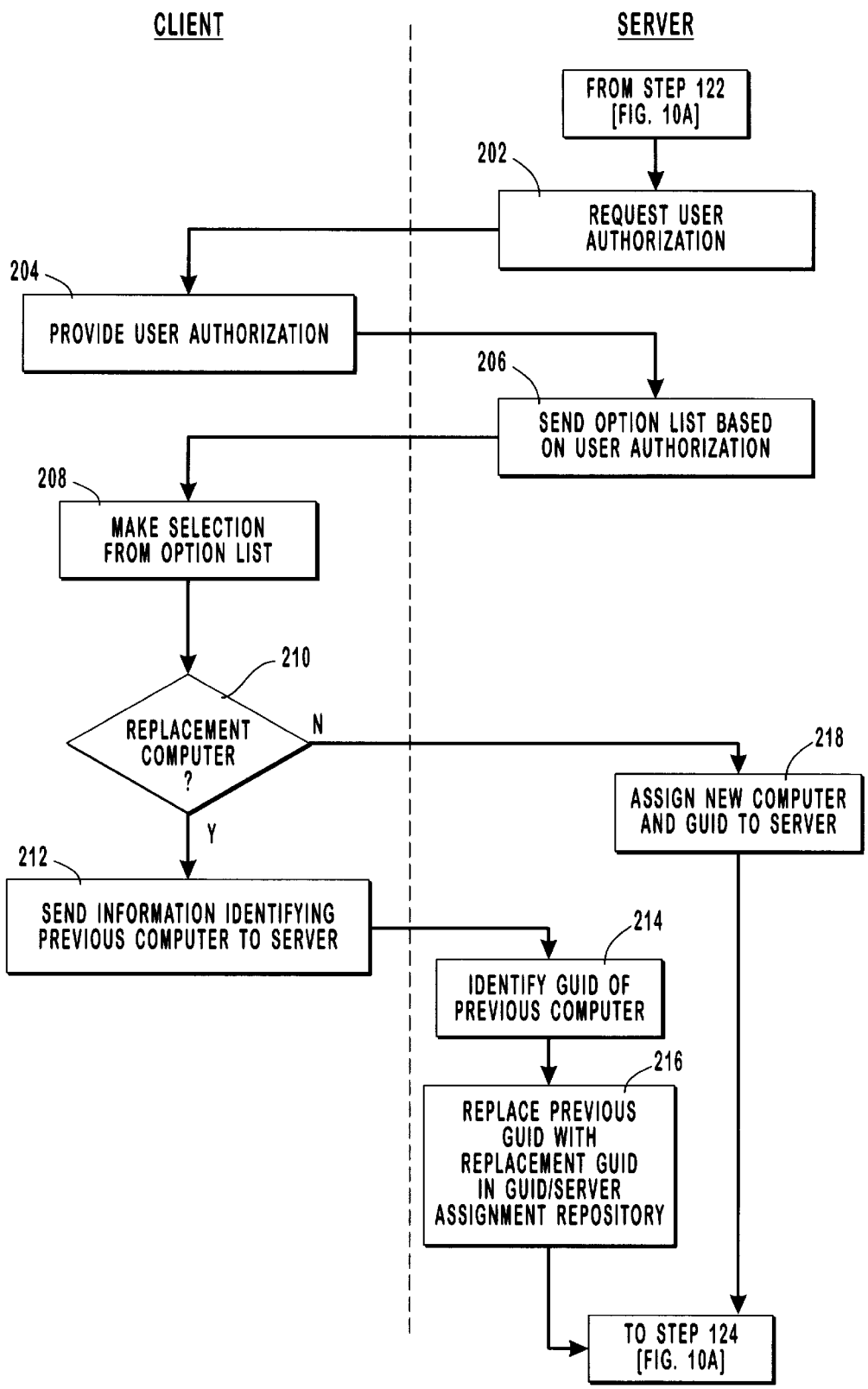
FIG. 11 is a flow diagram illustrating a sub-routine of the method of FIGS. 10A–10C, wherein the server computer recognizes a client computer as being a new or replacement client computer.
Figure 12:
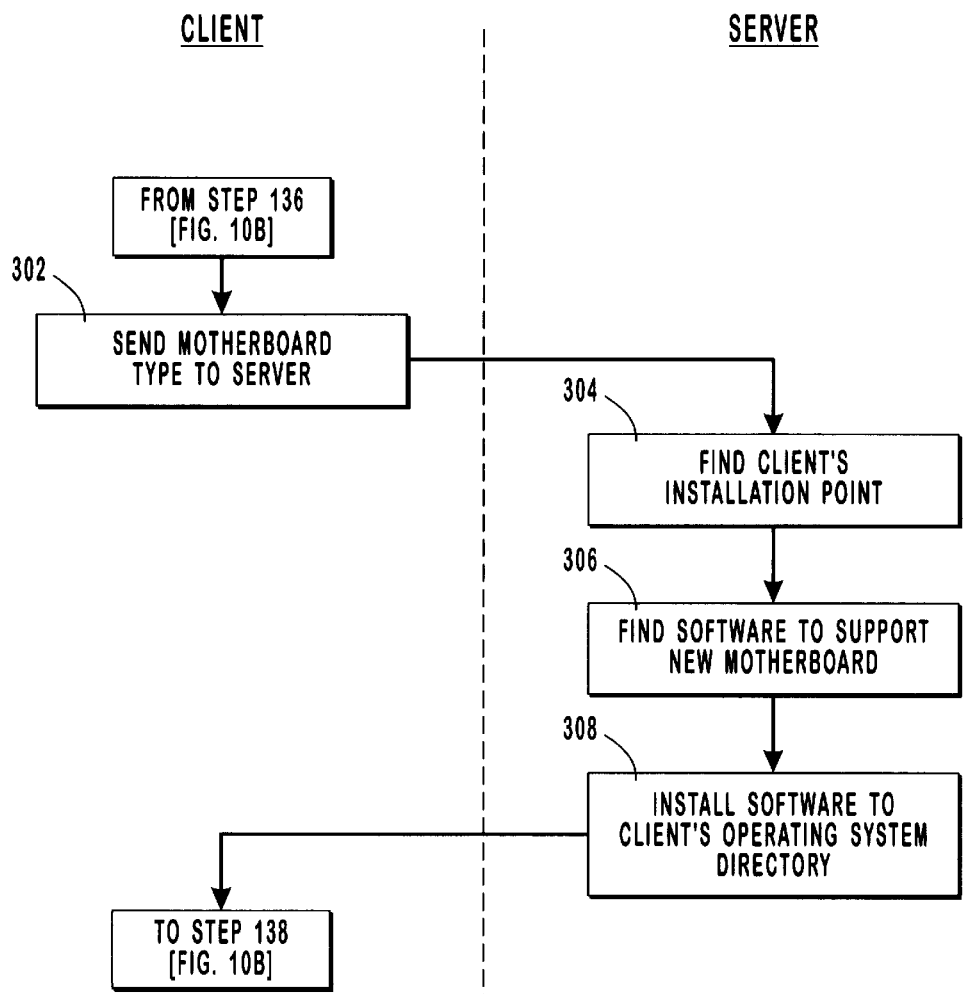
FIG. 12 is a flow diagram illustrating a sub-routine of the method of FIGS. 10A–10C, wherein the operating system is reconfigured for a new motherboard.

Step 120 and decision block 122 are conducted as described above in reference to Example 2. In particular, GUID 286 is recognized as being new, and the method continues in the sub-routine illustrated in FIG. 11. Furthermore, the steps of FIG. 11 are conducted in substantially the same way that is described in reference to Example 2. Client computer 24d is recognized as a replacement for previous client computer 24c, and GUID/server assignment repository 66 is updated accordingly. Next, steps 124, 126, 128, 130, and 132 are conducted as described above in reference to Examples 1 and 2.

Client-side cache 292 is disabled in the same way described above in reference to Example 2, such that it is not used to boot the operating system. It can be understood that client-side cache 292 is essentially empty at this point or contains invalid data from a previous installation, since hard disk 288 is new. Thus, client-side cache 292 is appropriately not used during the later process of booting the operating system.

Replacement motherboard 280 is of a different type than previous motherboard 80. Thus, replacement motherboard type ID 284 is different from previous motherboard type ID 84 and, according to decision block 136, the method advances to the sub-routine depicted in the flow chart of FIG. 12. In view of the assumption that the previous configuration of the operating system is not compatible with replacement motherboard 280, this sub-routine reconfigures the operating system to support the replacement motherboard. In step 302, client computer 24d sends replacement motherboard type ID 284 to the assigned server. The server interprets the transmitted motherboard type ID 284 as a request to install the version of the operating system that supports the replacement motherboard 280. In step 304, the server then locates the installation point 70 of FIG. 3, which is a repository containing operating system software and device drivers from which the operating system for the previous client computer 24c originated.

Based on the information identifying replacement motherboard 280, the server finds the appropriate version of the operating system software in installation point 70 according to step 306. In step 308, the operating system software is installed in the client directory 38 that corresponds to client computer 24d. For example, the server may put the new operating system software in operating system components repository 54. Thus, the operating system stored in client directory 38 is now reconfigured to be compatible with motherboard 280 without requiring any user assistance.

Returning to FIG. 10B, decision block 138 and steps 140 and 142 may be skipped as described above in reference to Example 2, based on the assumption that the client-side cache was previously disabled after it was determined that client computer 24d is a replacement. Client computer 24d then compares the current NIC ID 278 to the previous NIC ID 78, which was included in the registry sent to the client computer in step 130, to determine whether NIC 274 is currently supported by appropriate operating system software and device drivers. According to decision block 146, replacement NIC ID 278 is different from previous NIC ID 78 because replacement NIC 274 and previous NIC 74 are of different types.

Figure 13:
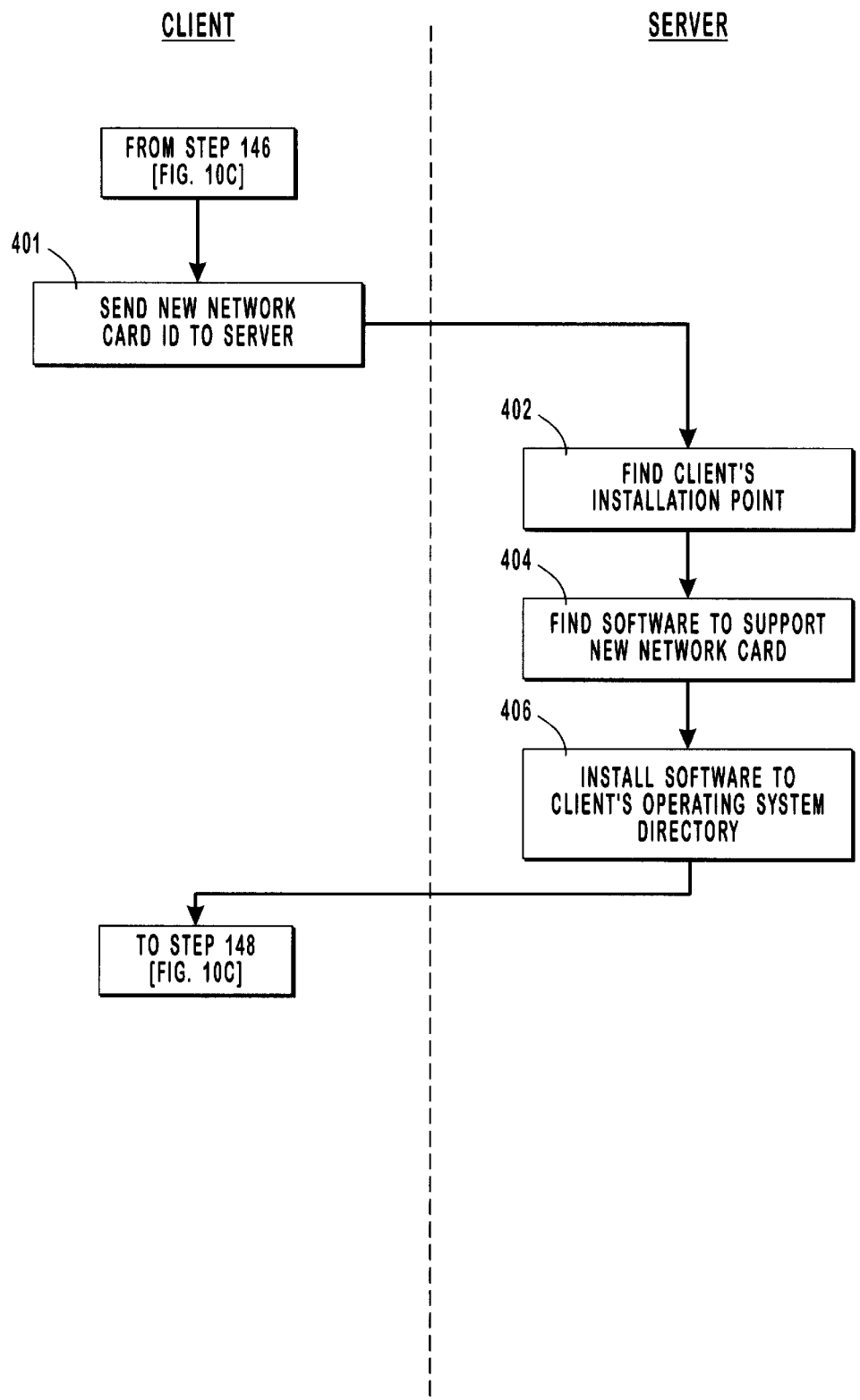
FIG. 13 is a flow diagram depicting a sub-routine of the method of FIGS. 10A–10C, wherein the operating system is reconfigured for a new network interface card.

The method then advances to the sub-routine illustrated in the flow diagram of FIG. 13. Based on the different network interface card IDs, the server assumes that the operating system configuration must be updated in order to boot the operating system on client computer 24d. As illustrated by step 401, client computer 24d sends the new network card ID to the server, thereby notifying the server that the new network interface card 278 is of a different type than previous network interface card 78. In step 402, the server identifies the installation point 70 associated with client computer 24d. Step 404 involves finding, in installation point 70, the device driver that supports replacement NIC 278. The appropriate device driver is then placed in the client directory 38 that corresponds to client computer 24d. The server computer also provides to the client computer information which may be needed to start the new device driver. The information required is operating system specific, and includes registry settings in the case of Windows NT.

At this point in the method of this example, the operating system software has been reconfigured and updated to support the new critical hardware components of client computer 24d. In addition, because hard disk 288 is new, it has been disabled during the balance of the boot process. Next, the remaining steps of the invention are conducted in substantially the same manner as described herein in reference to Example 2. Like Example 2, the method of this example recognizes the replacement client computer as a replacement for the previous client computer. In this example, it was determined that the operating system should be updated to support the changed critical hardware components. The server provided the appropriate operating, system software and device drivers to boot the operating system on the replacement computer with little or no user assistance.

EXAMPLE 4

Figure 9:
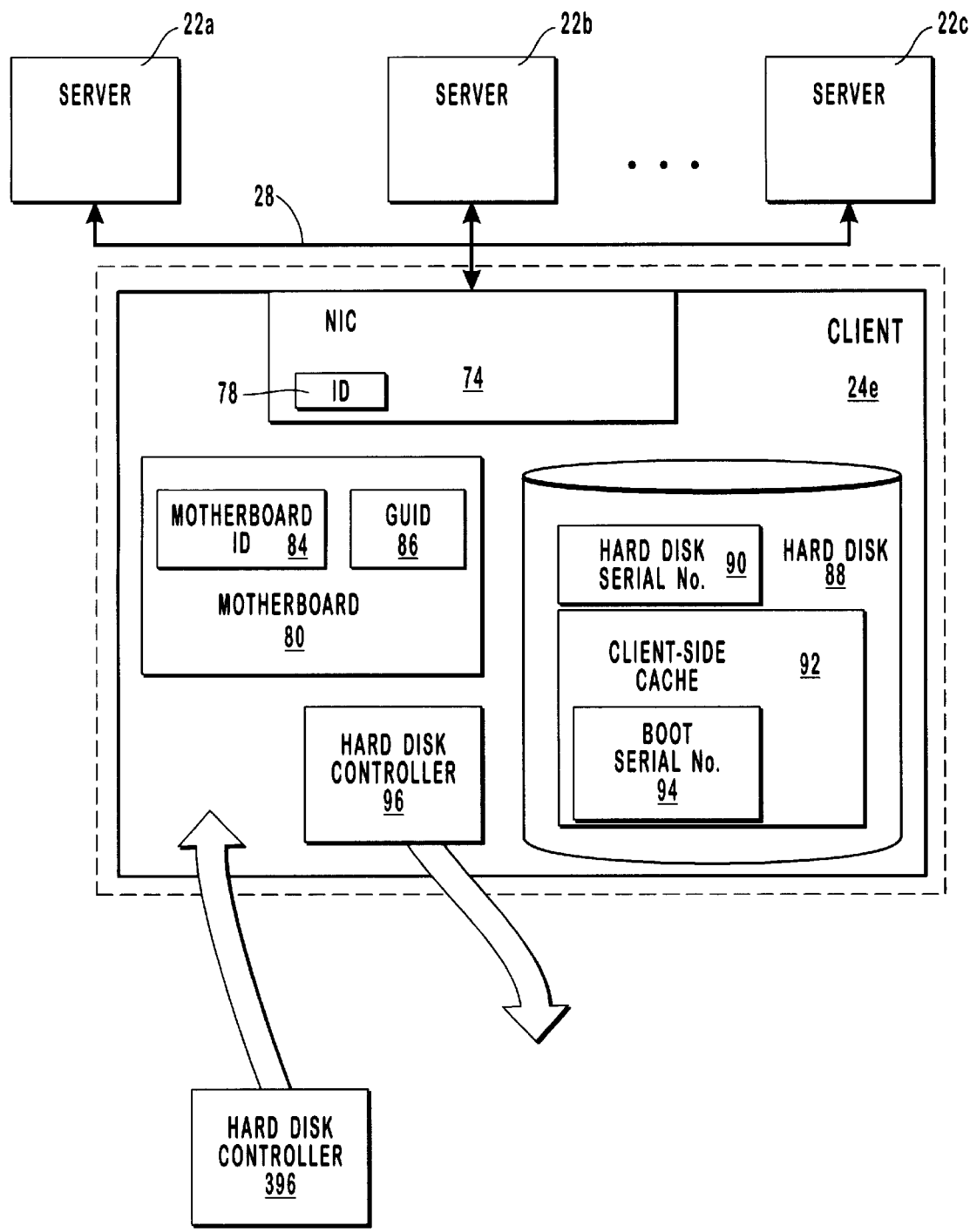
FIG. 9 is a schematic diagram showing the replacement of selected hardware components of a client computer with replacement hardware components.

FIG. 9 illustrates the replacement of only selected hardware components of a client computer. In this example, the previous hard disk controller is replaced with a new hard disk controller of a different type. In this example, the hard disk controller 396 is not a critical hardware component in the sense that the operating system must be reconfigured before booting. However, the new hard disk controller presents special considerations that are analyzed below. It is further assumed that client computer 24c, with its previous hardware configuration, has been connected at least once to its assigned server.

In step 120, client computer 24e makes a server request as described herein in reference to Example 1. GUID 86 is recognized in decision block 122, after which steps 124, 126, 128, 130, and 132 are conducted as described herein in reference to the other examples. Although replacement hard disk controller 396 is of a different type than the previous controller 96, hard disk serial number 90 and client-side boot serial number 94 may be read from hard disk 88 according to this embodiment because the protocols for doing so are sufficiently standard among hard disk controllers of different types.

The method proceeds through decision blocks 134 and 136 in the same manner as described in reference to Example 1. Hard disk 88 has not been replaced, and the method advances from decision block 138 to decision block 146. Thus, hard disk 88 is not disabled, and is in condition to be used during the subsequent process of booting the operating system. However, it is noted that hard disk controller 396 has not yet been supported by a corresponding device driver, and will not be until after the operating system boots. As a result, hard disk 88 is inaccessible, and the operating system is booted in this example without the assistance of the hard disk. Step 146 is conducted as described above in reference to Example 1. In particular, network interface card 74 remains unchanged, and the operating system already supports it.

Steps 148 and 150 are conducted, wherein the reconfigured operating system is downloaded from the server to client computer 24e and is executed on the client computer. Steps 152, 154, 156, and 160 are then conducted as described above in reference to Example 1, but without the use of hard disk 88, which remains inaccessible due to replacement hard disk controller 396. In this example, hard disk 88 is not used to boot the operating system, with the result that client-side boot serial number 94 is not incremented. The next time that the operating system is booted, client-side boot serial number 94 and server-side boot serial number 42 will be out of synchronization, indicating that client-side cache 92 is stale. It can be understood that this non-synchronization of the boot serial numbers is appropriate, since during the present network session client-side cache 92 is not being updated.

Next, in step 162, a device driver that supports replacement hard disk controller 396 may be installed. However, in this embodiment, the device driver for the hard disk controller 396 does not actually allow the hard disk controller to operate until the operating system boots again. Optionally, the user may continue to operate client computer 24e over the network without accessing hard disk 88, which is made possible by the client information stored in client directory 38. According to this option, client computer 24e operates "diskless" until the next time the operating system boots during the normal use of the network. Alternatively, the methods of FIGS. 10A–10C may be immediately repeated so that the operating system reboots and replacement hard disk controller 396 becomes operable. In either event, client-side cache 92 cannot be updated in steps 164 and 166 before client computer 24e is rebooted because hard disk 88 remains inaccessible.

According to the foregoing example, the replacement of only some of the critical and non-critical hardware components is automatically recognized, and the operating system is reconfigured to support the new hardware components with little or no user assistance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a client computer, a server computer, and a network infrastructure, in which the server computer provides operating system components to the client computer via the network infrastructure, a method of using the server computer for adjusting the operating system components in a client computer hardware configuration in response to replacement or other change of a hardware component and booting the operating system components on the client computer, the method comprising the following steps:

establishing a connection between the client computer and the server computer over the network infrastructure before booting the operating system components on the client computer, and transmitting from the server computer to the client computer the number of times the client computer has booted its operating system while connected to the server;

transmitting information identifying the replacement hardware component from the client computer to the server computer;

modifying the operating system components in response to the transmitted information before booting the operating system components;

transmitting the operating system components from the server computer to the client computer; and booting the operating system components on the client computer.

2. A method as defined in claim 1, wherein the replacement hardware component is such that the operating system components could not boot on the second client computer in the absence of the step of modifying the operating system components.

3. A method as defined in claim 1, further comprising, before the step of transmitting information identifying the replacement hardware component, the step of sending from the server computer to the client computer previous hardware information identifying the previous hardware component.

4. A method as defined in claim 3, further comprising the step of determining that the replacement hardware component has replaced the previous hardware component by comparing the previous hardware information to replacement hardware information identifying the replacement hardware component.

5. A method as defined in claim 1, wherein the step of transmitting the number of times the client computer has booted the operating system components while being connected to the server computer is comprised of transmitting a server-side boot serial number from the server computer to the client computer, the server-side boot serial number representing the number of times the client computer has booted the operating system components while being connected to the server computer.

6. A method as defined in claim 5, further comprising the steps of:
   comparing the server-side boot serial number to a client-side boot serial number, wherein the server-side boot serial number is greater than the client-side boot serial number if the client computer last booted without access to a hard disk at the client computer; and
   if the server-side boot serial number is greater than the client-side boot serial number, then disabling a local cache stored on the hard disk before the step of booting the operating system components.

7. A method as defined in claim 1, further comprising the step of transmitting a previous hard disk serial number from the server computer to the client computer the previous hard disk serial number identifying a previous hard disk included in the client computer when the client computer was last connected to the server computer.

8. A method as defined in claim 7, further comprising the steps of:
   comparing the previous hard disk serial number to a current hard disk serial number identifying a current hard disk included in the client computer; and
   if the previous hard disk serial number is different from the current hard disk serial number, then disabling a local cache stored on the current hard disk before the step of booting the operating system components.

9. A method as defined in claim 1, wherein the step of transmitting information identifying the replacement hardware component comprises the step of transmitting data identifying a replacement motherboard included in the client computer.

10. A method as defined in claim 9, further comprising, before the step of transmitting data identifying the replacement motherboard, the step of comparing the data identifying the replacement motherboard with previous motherboard information identifying a previous motherboard included in the client computer when the client computer was last connected to the server computer, the previous motherboard information having been sent from the server computer to the client computer.

11. A method as defined in claim 1, wherein the step of transmitting information identifying the replacement hardware component comprises the step of transmitting data identifying a replacement network interface card included in the client computer.

12. A method as defined in claim 11, further comprising, before the step of transmitting data identifying the replacement network interface card, the step of comparing the data identifying the replacement network interface card with previous network interface card information identifying a previous network interface card included in the client computer when the client computer was last connected to the server computer, the previous network interface card information having been sent from the server computer to the client computer.

13. In a networked system including a server computer and a network infrastructure over which the server computer can download operating system components to client computers, a method of using the server computer for adjusting the operating system components in response to a change in the hardware configuration that results from a replacement of a first client computer with a second client computer and booting the operating system components on the second client computer, the first client computer having a first hardware component and the second client computer having a corresponding second hardware component that is of a different type than the first hardware component, the method comprising the following steps:
   establishing a connection over the network infrastructure between the second client computer and the server computer prior to booting the operating system components on the second client computer, and transmitting a server-side boot serial number from the server computer to the second client computer, the server-side boot serial number representing the number of times the first client computer has booted the operating system components while being connected to the server computer;
   determining, by the second client computer, that the second hardware component is of a different type than the first hardware component;
   transmitting information identifying the second hardware component from the second client computer to the server computer;
   modifying the operating system components in response to the transmitted information before booting the operating system components, the modified operating system components being compatible with the second hardware component;
   transmitting the operating system components from the server computer to the second client computer; and
   booting the operating system components on the second client computer.

14. A method as defined in claim 13, wherein the second hardware component is such that the operating system components could not boot on the second client computer in the absence of the step of modifying the operating system components.

15. A method as defined in claim 13, wherein the step of modifying the operating system components comprises the steps of:
   identifying, by the server computer, software that supports the second hardware component; and
   installing the software in an operating system directory located at the server computer and associated with the second client computer.

16. A method as defined in claim 13, further comprising the step of maintaining a local cache at the second client computer, including a copy of the operating system components provided by the server computer.

17. A method as defined in claim 13, further comprising, after the step of booting the operating system components, the step of further modifying the operating system components to support changed hardware components of the second client computer other than the second hardware component.

18. In a system including a client computer, a server computer, and a network infrastructure, in which the server computer provides operating system components to the client computer via the network infrastructure, a method for limiting access to a hard disk on the client computer before the operating system components are booted on the client computer, the method comprising the following steps:

establishing a connection between the client computer and the server computer over the network infrastructure before booting the operating system components on the client computer, the server computer having a repository wherein client information associated with the client computer is stored, the client information including operating system components compatible with the client computer;

transmitting from the server computer to the client computer a server-side boot serial number from the server computer to the client computer, the server-side boot serial number representing the number of times the client computer has booted the operating system components while being connected to the server computer;

recognizing that a hard disk at the client computer does not have a complete copy of the client information;

disabling the hard disk;

downloading the operating system components over the network infrastructure from the server computer to the client computer; and booting the operating system components on the client computer without the assistance of the hard disk.

19. A method as defined in claim 18, wherein the step of recognizing that the hard disk does not have a complete copy of the client information comprises the step of comparing a hard disk serial number associated with the hard disk to a previous hard disk serial number associated with a previous hard disk included in the client computer when the client computer was last connected to the server computer.

20. A method as defined in claim 18, wherein the step of recognizing that the hard disk does not have a complete copy of the client information comprises the step of recognizing that the client computer has not previously been connected to the server.

21. A method as defined in claim 18, wherein the step of recognizing that the hard disk does not have a complete copy of the client information comprises the step of comparing a server-side boot serial number to a client-side boot serial number, wherein the server-side boot serial number represents the number of times the client computer has booted the operating system components while being connected to the server computer, and wherein the client-side boot serial number is less than the server-side boot serial number if the client computer last booted without access to the hard disk.

22. A method as defined in claim 18, further comprising, after the step of booting the operating system, the steps of:

enabling the hard disk; and storing a complete copy of the client information on the hard disk.

23. In a system including a client computer, a server computer, and a network infrastructure, in which the server computer provides operating system components to the client computer via the network infrastructure, a method for adjusting the operating system components in response to a change in a client computer hardware configuration and booting the operating system components on the client computer, the method comprising the following steps:

establishing a connection between the client computer and the server computer prior to booting the operating system components on the client computer;

transmitting from the server computer to the client computer the number of times the client computer has booted its operating system while connected to the server;

transferring information between the client computer and the server computer via the connection, wherein the information identifies either current hardware components of the client computer or previous hardware components of the client;

comparing the information identifying the current hardware components with the information identifying the previous hardware components so as to identify any of the current hardware components that have changed since the client computer was last connected to the server computer;

if any of the current hardware components has changed, and if at least one changed hardware component requires a modification of the operating system components before the operating system components can be booted on the client computer, then placing, by the server computer, software components that support the modification in an operating system directory accessible to the client computer; and booting the operating system components, including any software components, on the client computer.

24. In a server computer interconnected with a client computer via a network infrastructure, a computer program product for implementing a method for adjusting operating system components in response to a change in a client computer hardware configuration and providing the operating system components to the client computer, the computer program product comprising:

a computer-readable medium for carrying computer-executable instructions, wherein said computer-executable instructions comprise:

code means for establishing a connection between the client computer and the server computer, the connection being established prior to booting the operating system components on the client computer;

code means for transmitting from the server computer to the client computer the number of times the client computer has booted its operating system while connected to the server;

code means for transmitting to the client previous hardware information identifying a previous hardware component of the client computer;

code means for receiving from the client computer, prior to booting the operating system components on the client computer, notification that a replacement hardware component of the client computer has replaced the previous hardware component;

code means for modifying operating system components stored in the server computer so as to be compatible with the replacement hardware component; and code means for initiating transmission of the modified operating system components to the client computer over the network infrastructure so that the modified operating system components can be booted on the client computer.

25. A computer program product as defined in claim 24, wherein the computer-readable medium further carries computer-readable data comprising the previous hardware information.

26. A computer program product as defined in claim 24, wherein the code means for modifying operating system components comprise code means for identifying software that supports the replacement hardware component.

27. A computer program product as defined in claim 26, wherein the code means for modifying operating system components further comprise code means for installing the software in an operating system directory on the computer-readable medium and associated with the client computer.

28. A computer program product as defined in claim 24, wherein the computer-executable instructions further comprise code means for initiating transmission of information stored in a client directory on the computer-readable medium to the client computer, such that a copy of the information can also be stored at the client computer.

* * * * *

UNITED STATES PATENT AND TRADEMARK OFFICE
CERTIFICATE OF CORRECTION

PATENT NO.    : 6,209,089 B1　　　　　　　　　　　　　　　　　　　Page 1 of 1
DATED         : March 27, 2001
INVENTOR(S)   : Sean Selitrennikoff, Adam D. Barr and Charles T. Lenzmeier It is certified that error appears in the above-identified patent and that said Letters Patent is hereby corrected as shown below:

Title page,
Item [54], after "HARDWARE" and before "USING" insert -- WHEN --

Column 4,
Line 67, after "replacement" change "computers" to -- computer --

Column 5,
Line 50, after "can" and before "accessed" insert -- be --

Column 12,
Line 14, after "executes" changes "code" to -- codes --

Signed and Sealed this

Ninth Day of April, 2002

Attest:

Attesting Officer

JAMES E. ROGAN
Director of the United States Patent and Trademark Office